US011942284B2

(12) United States Patent
Fujita et al.

(10) Patent No.: US 11,942,284 B2
(45) Date of Patent: Mar. 26, 2024

(54) PUSH SWITCH DEVICE

(71) Applicant: OMRON Corporation, Kyoto (JP)

(72) Inventors: Hiroyuki Fujita, Kyoto (JP); Kenji Shinohara, Kyoto (JP); Hiroto Yonehara, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/713,266

(22) Filed: Apr. 5, 2022

(65) Prior Publication Data

US 2022/0328264 A1 Oct. 13, 2022

(30) Foreign Application Priority Data

Apr. 12, 2021 (JP) .................................. 2021-67078

(51) Int. Cl.
*H01H 13/14* (2006.01)
*H01H 13/50* (2006.01)

(52) U.S. Cl.
CPC ............ *H01H 13/14* (2013.01); *H01H 13/50* (2013.01)

(58) Field of Classification Search
CPC .......... H01H 13/14; H01H 13/50; H01H 1/40; H01H 2221/072; H01H 2227/028; H01H 1/36; H01H 13/20; H01H 3/12; H01H 13/52; H01H 2201/004; H01H 1/18; H01H 1/365
See application file for complete search history.

(56) References Cited

U.S. PATENT DOCUMENTS 4,712,079 A * 12/1987 Marquardt .......... H01H 50/545 335/198
9,941,068 B2 * 4/2018 Liu .......................... H01H 3/50
10,658,137 B1 * 5/2020 Tsai ......................... H01H 3/12
2019/0393003 A1 * 12/2019 Wang ..................... H01H 13/52

FOREIGN PATENT DOCUMENTS

JP 3169859 U 8/2011

* cited by examiner

*Primary Examiner* — Lheiren Mae A Caroc
(74) *Attorney, Agent, or Firm* — METROLEX IP LAW GROUP, PLLC

(57) ABSTRACT

A switch device may include a pressing member, an urging member, fixed contacts, at least one movable contact swingable in a direction intersecting with a movement direction of the pressing member and connecting and disconnecting between the fixed contacts. The pressing member may include a slider portion extending in a direction oblique to the movement direction and slidable along the movable contact. The movable contact may be pressed by the slider portion in the pressing member sliding to swing and come in contact with and separate from at least one of the fixed contacts in response to the pressing member moving from a reference position to a pressed position.

20 Claims, 17 Drawing Sheets

1A

PUSH SWITCH DEVICE

CROSS-REFERENCE TO RELATED APPLICATION

This application claims priority to Japanese Patent Application No. 2021-067078 filed on Apr. 12, 2021, the contents of which are incorporated herein by reference.

FIELD

The disclosure relates to a switch device, and more particularly, to a push switch device.

BACKGROUND

A known switch device includes a pressing member that moves from a reference position to a pressed position in a predetermined movement direction upon receiving an external pressing force and returns from the pressed position to the reference position upon being released from the pressing force, multiple fixed contacts, and a movable contact for connecting and disconnecting between the multiple fixed contacts by coming in contact with and separating from the fixed contacts as the pressing member moves (e.g., Patent Literature 1).

CITATION LIST

Patent Literature

Patent Literature 1: Japanese Registered Utility Model No. 3169859

SUMMARY

In the switch device described in Patent Literature 1, the pressing member has the movable contact. The movable contact thus moves by the same distance as the pressing member moves. Extending the stroke of the pressing member to increase robustness against positional variations of the peripheral components operating the switch device thus increases the distance by which the movable contact moves. The movable contact moving by a longer distance slides on the fixed contacts by a longer distance, which increases the wear of the fixed contacts and lowers the reliability of contact between the movable contact and the fixed contacts.

One or more embodiments are directed to a switch device that may reduce the likelihood of lower reliability of contact between a movable contact and fixed contacts.

A switch device according to one or more embodiments may include a pressing member that moves from a reference position to a pressed position in a predetermined movement direction upon receiving an external pressing force and returns to the reference position upon being released from the external pressing force, an urging member that urges the pressing member toward the reference position, a plurality of fixed contacts, and at least one movable contact swingable in a direction intersecting with the movement direction of the pressing member. The at least one movable contact connects and disconnects between the plurality of fixed contacts. The pressing member includes a slider portion extending in a direction oblique to the movement direction and slidable along the at least one movable contact. The at least one movable contact is pressed by the slider portion in the pressing member sliding to swing and come in contact with and separate from at least one of the plurality of fixed contacts in response to the pressing member moving from the reference position to the pressed position.

In the switch device, the slider portion may have a plurality of inclined surfaces extending in directions oblique at different angles to the movement direction of the pressing member.

In the switch device, the plurality of inclined surfaces may extend at a smaller angle to the movement direction of the pressing member when the at least one movable contact is in contact with one of the plurality of fixed contacts than when the at least one movable contact is out of contact with the plurality of fixed contacts.

In the switch device, the at least one movable contact may include an arm electrically connected to one of the plurality of fixed contacts, and the at least one movable contact may swing and come in contact with and separate from another of the plurality of fixed contacts in response to the arm being pressed by the slider portion in the pressing member sliding.

In the switch device, the at least one movable contact may include a plurality of contact points that come in contact with and separate from at least one of the plurality of fixed contacts.

In the switch device, the at least one movable contact may include a plurality of movable contacts.

In the switch device, the pressing member may include a plurality of the slider portions for the plurality of movable contacts.

In the switch device, the plurality of movable contacts may be a pair of movable contacts, and the pressing member may include a pair of the slider portions for the pair of movable contacts.

In the switch device, the plurality of fixed contacts may include a first fixed contact and a second fixed contact. The at least one movable contact may be electrically connected to the first fixed contact. The at least one movable contact may come in contact with the second fixed contact in response to the pressing member moving to the pressed position and separate from the second fixed contact in response to the pressing member moving to the reference position.

In the switch device, the plurality of fixed contacts may include a first fixed contact and a second fixed contact. The at least one movable contact may be electrically connected to the first fixed contact. The at least one movable contact may separate from the second fixed contact in response to the pressing member moving to the pressed position and come in contact with the second fixed contact in response to the pressing member moving to the reference position.

In the switch device, the plurality of fixed contacts may include a first fixed contact, a second fixed contact, and a third fixed contact. The at least one movable contact may be electrically connected to the first fixed contact. The at least one movable contact may separate from the second fixed contact and come in contact with the third fixed contact in response to the pressing member moving to the pressed position and may separate from the third fixed contact and come in contact with the second fixed contact in response to the pressing member moving to the reference position.

The switch device according to one or more embodiments may reduce the likelihood of lower reliability of contact between the movable contact and the fixed contacts.

DETAILED DESCRIPTION

Figure 1:
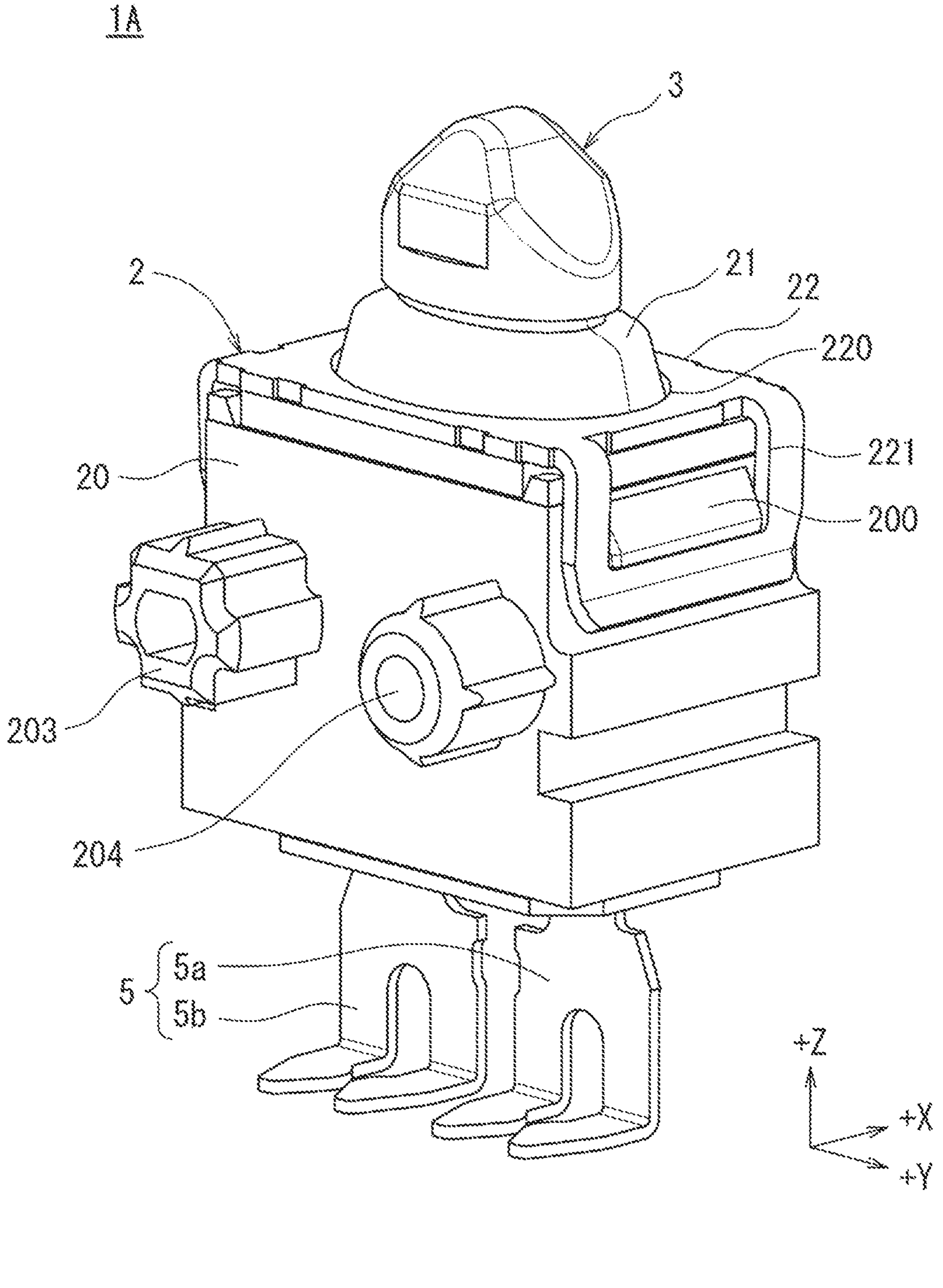
FIG. 1 is a diagram illustrating a perspective view of a switch device according to a first embodiment or embodiments.

One or more embodiments will now be described with reference to the accompanying drawings. The same components are given the same reference numerals in the embodiments described below, and redundant descriptions are omitted.

Example Use

A switch device of the present disclosure according to one or more embodiments may be an in-vehicle microswitch used for, for example, detecting a seat position, an open or closed state of a sunroof, and an open or closed state of a door.

First Embodiment

Switch Device

Figure 2:
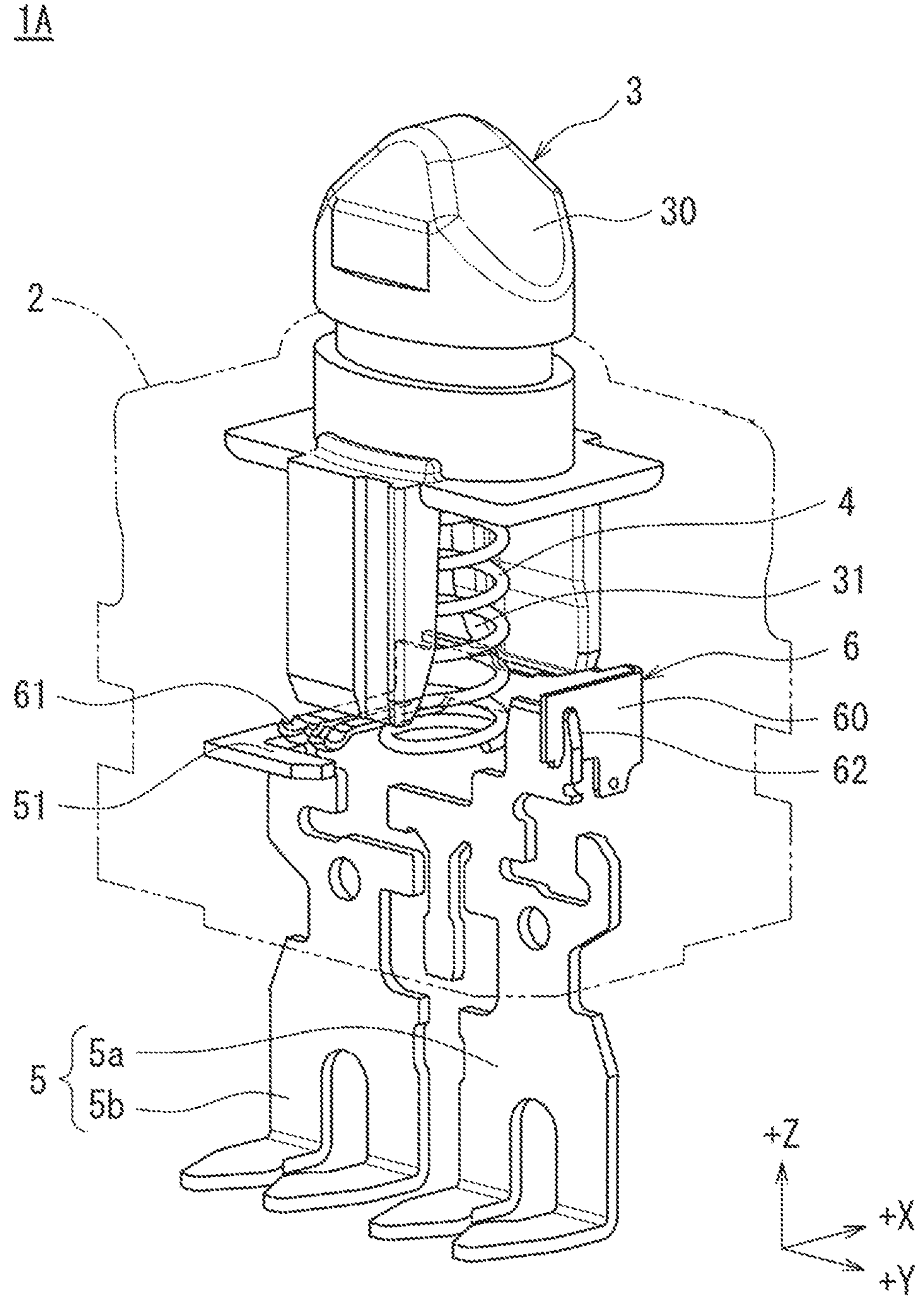
FIG. 2 is a diagram illustrating a transparent perspective view of a switch device, such as is shown in FIG. 1, showing an example internal structure.
Figure 3:
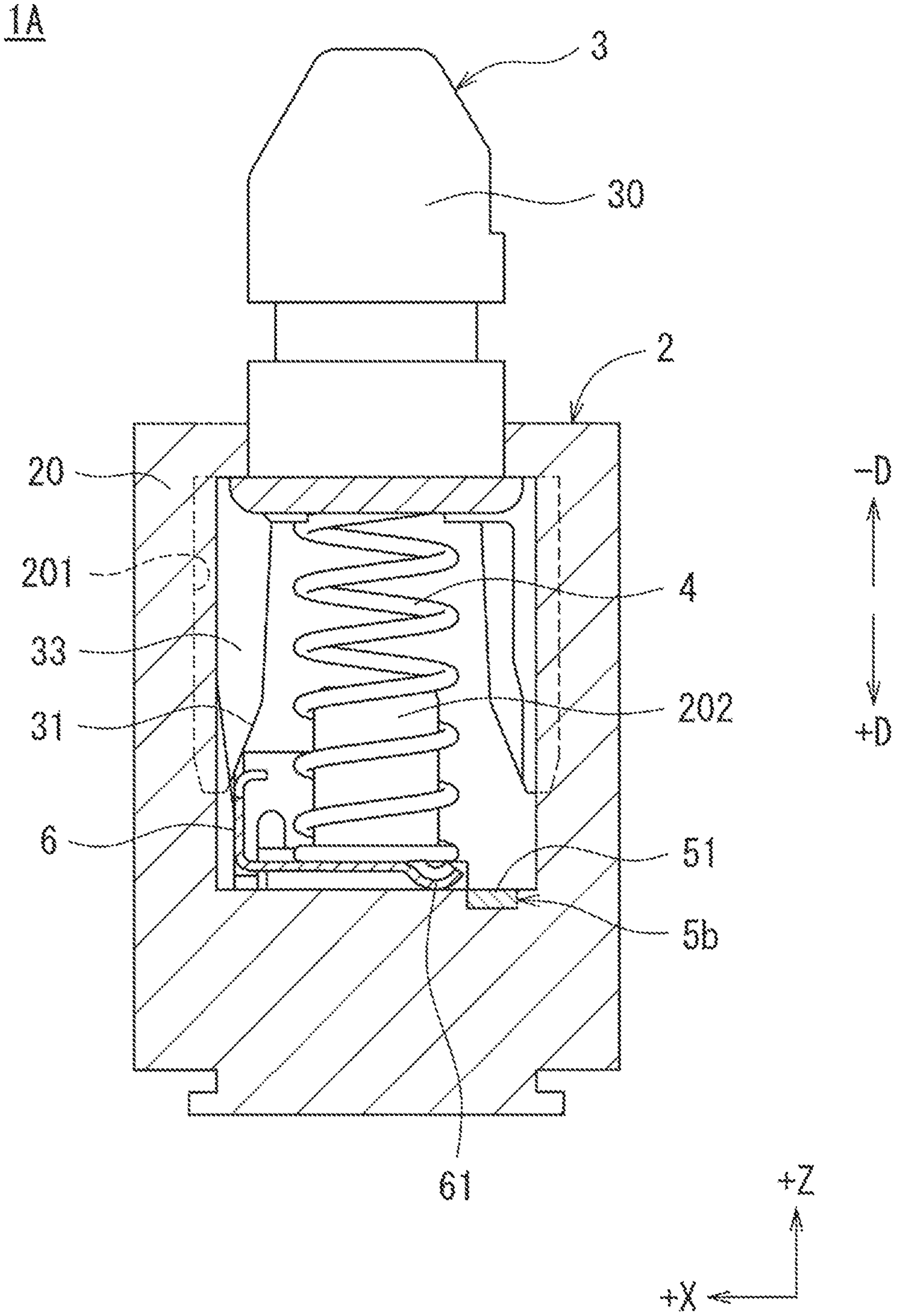
FIG. 3 is a diagram illustrating a side view of a switch device, such as is shown in FIG. 2 viewed from a left side, showing an internal structure.
Figure 4:
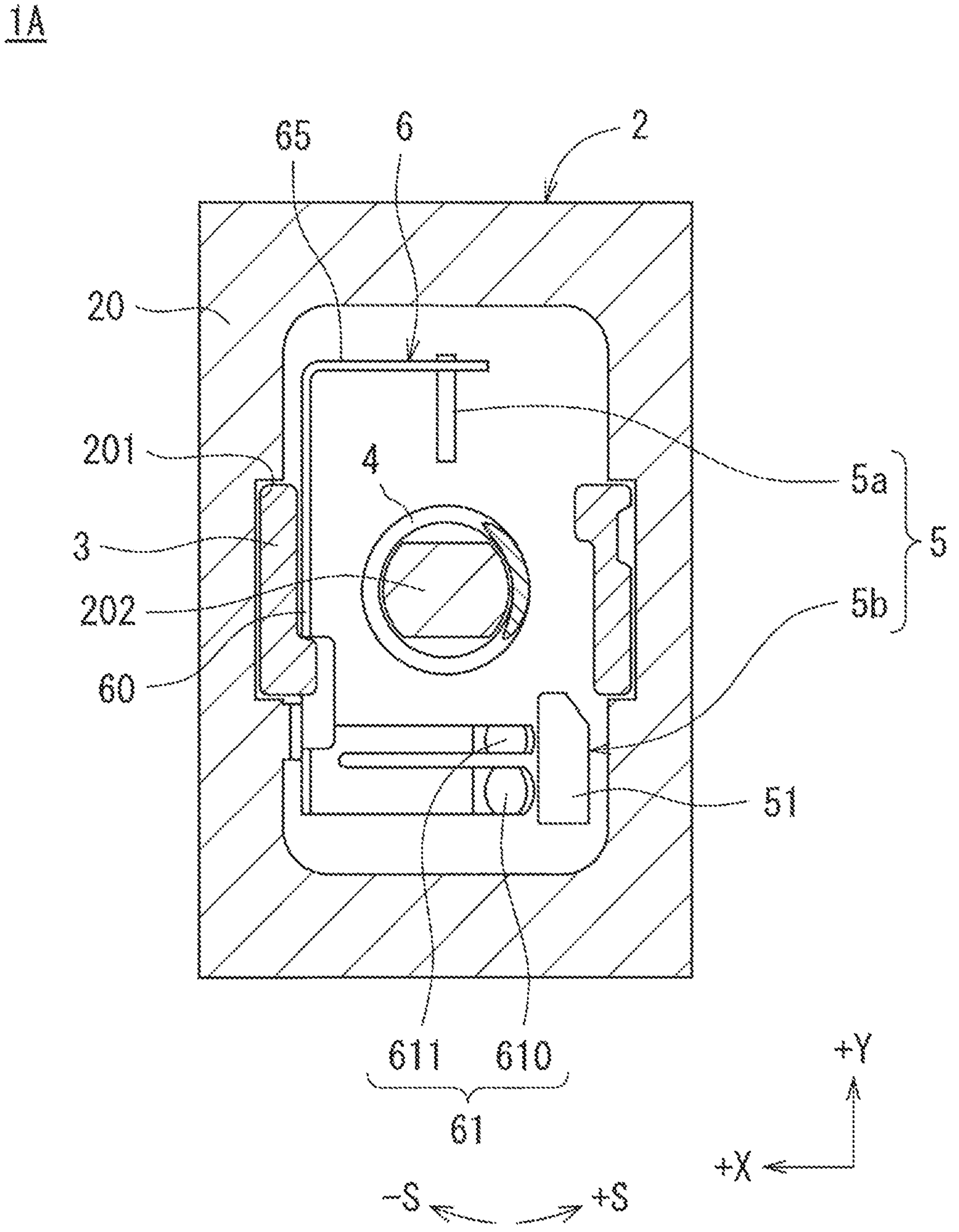
FIG. 4 is a diagram illustrating a plan view of a switch device, such as is shown in FIG. 2 viewed from above, showing an internal structure.

FIG. 1 is a perspective view of a switch device 1A according to a first embodiment or embodiments. FIG. 2 is a transparent perspective view of the switch device 1A in FIG. 1, showing its example internal structure. FIG. 3 is a side view of the switch device 1A in FIG. 2 viewed from the left, showing the internal structure. FIG. 4 is a plan view of the switch device 1A in FIG. 2 viewed from above, showing the internal structure.

In the figures, the X direction is the front-rear direction (depth direction) of the switch device 1 (A, B, C, D). The −X direction (negative X direction) is the frontward direction and the +X direction (positive X direction) is the rearward direction. The Y direction is the right-left direction of the switch device 1 (A, B, C, D). The −Y direction (negative Y direction) is the leftward direction and the +Y direction (positive Y direction) is the rightward direction. The Z direction is the up-down direction of the switch device 1 (A, B, C, D). The −Z direction (negative Z direction) is the downward direction and the +Z direction (positive Z direction) is the upward direction. The same applies to the embodiments described below. The directions used herein are for ease of explanation, and do not limit the orientation of the switch device 1 according to one or more embodiments.

The switch device 1A according to a first embodiment or embodiments includes a housing 2, a pressing member 3, an urging member 4, fixed contacts 5 (5*a*, 5*b*), and a movable contact 6 (refer to FIGS. 1 to 4). In the switch device 1A according to a first embodiment or embodiments, the pressing member 3 reciprocates in a movement direction D (+D/−D) parallel to the up-down direction (Z direction) to allow the movable contact 6 to connect and disconnect between the fixed contacts 5 (5*a*, 5*b*).

Housing

The housing 2 includes a housing body 20, a cover 21, and a cover holder 22 (refer to FIG. 1). The housing 2 accommodates the pressing member 3, the urging member 4, the multiple fixed contacts 5 (5*a*, 5*b*), and the movable contact 6. In the housing 2 in a first embodiment or embodiments, the cover 21 is placed on the housing body 20, and the cover holder 22 is placed over the cover 21.

The housing body 20 is a substantially rectangular prism (refer to FIG. 1). The housing body 20 is formed by, for example, injection molding using a synthetic resin material.

The housing body 20 in a first embodiment includes, on the upper outer surfaces on its two sides, receiving portions 200 with which the cover holder 22 is engaged. The housing body 20 in a first embodiment or embodiments has, on its front inner surface, a guide groove 201 in the up-down direction (Z direction) for guiding the pressing member 3 in the movement direction D (refer to FIGS. 3 and 4). An urging member positioning boss 202 for positioning the urging member 4 is in the housing body 20 (refer to FIGS. 3 and 4).

The housing body 20 has, on its outer surface, pins 203 and 204 that can be fitted with peripheral components of the switch device 1A (refer to FIG. 1).

The cover 21 prevents foreign matter such as water and dust from entering the housing body 20. The cover 21 is an elastic member that is, for example, waterproof, dustproof, and flexible, such as rubber. The cover 21 deforms elastically as the pressing member 3 moves.

The cover holder 22 is squared U-shaped (substantially U-shaped) and opens downward (−Z direction) (refer to FIG. 1). The cover holder 22 has, in its center, a through-hole 220 through which the pressing member 3 protrudes outside the housing 2. The cover holder 22 in a first embodiment or embodiments includes, in its two ends, engaging portions 221 engaged with the receiving portions 200 in the housing body 20.

Pressing Member

Figure 5:
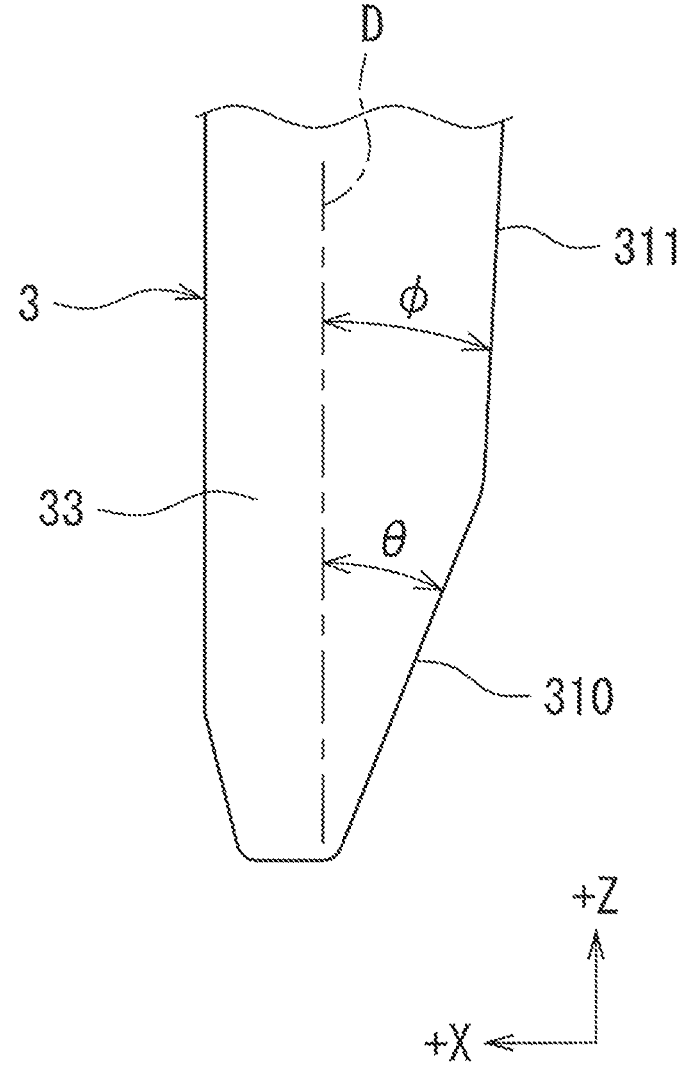
FIG. 5 is a schematic diagram illustrating an example slider portion in a first embodiment or embodiments.

FIG. 5 is a schematic diagram of an example slider portion 31 in a first embodiment or embodiments.

The pressing member 3 moves from a reference position to a pressed position in the movement direction D upon receiving an external pressing force and returns to the reference position upon being released from the external pressing force. The external pressing force includes, for example, a pressing force resulting from an operation of a peripheral component of the switch device 1A. The reference position refers to the position of the pressing member 3 without receiving any external pressing force. The pressed position refers to the position of the pressing member 3 farthest from the reference position in the movable range of the pressing member 3 upon receiving an external pressing force. The reference position in a first embodiment or embodiments is upward (in the +Z direction) from the pressed position. The pressed position in a first embodiment or embodiments refers to the position of the pressing member 3 hitting the bottom surface of the housing body 20 and being restricted from moving further downward (−Z direction).

The pressing member 3 includes a button 30 and the slider portion 31 (refer to FIGS. 2 and 3).

The button 30 receives an external pressing force. The button 30 in a first embodiment or embodiments has a substantially quadrangular pyramidal upper end (refer to FIGS. 1 to 3).

The slider portion 31 extends in a diagonal direction defined by the −X and +Z directions oblique to the movement direction D. The slider portion 31 is slidable along the movable contact 6. In a first embodiment or embodiments, the slider portion 31 slides along the movable contact 6 by moving along the movable contact 6.

The slider portion 31 in a first embodiment or embodiments has a first inclined surface 310 and a second inclined surface 311. The first inclined surface 310 and the second inclined surface 311 are included in the inner side surface of a leg 33, which extends downward from the button 30 along the front inner surface of the housing 2. The first inclined surface 310 and the second inclined surface 311 extend in directions that are oblique at different angles to the movement direction D of the pressing member 3 (refer to FIGS. 3 and 5). The first inclined surface 310 extends in a direction oblique at an angle θ to the movement direction D of the pressing member 3 as viewed in the right-left direction (Y direction). The second inclined surface 311 extends upward (in the +Z direction) from the first inclined surface 310 in a direction oblique at an angle φ smaller than the angle θ to the movement direction D of the pressing member 3 as viewed in the right-left direction (Y direction).

A specific example of the pressing member 3 in a first embodiment or embodiments with the slider portion 31 that slides along the movable contact 6 will now be described with reference to FIG. 3. As the pressing member 3 moves from the reference position to the pressed position in the +D direction, the slider portion 31 in the pressing member 3 comes in contact with the movable contact 6 in the +D direction and slides along the movable contact 6. As described above, the slider portion 31 in a first embodiment or embodiments extends in the diagonal direction defined by the −X and +Z directions. The slider portion 31 coming in contact with the movable contact 6 in the +D direction allows the movable contact 6 to slide in the diagonal direction defined by the −X and +Z directions relative to the pressing member 3. Accordingly, the pressing member 3 has the slider portion 31 sliding along the movable contact 6.

Urging Member

The urging member 4 urges the pressing member 3 toward the reference position. The urging member 4 is, for example, a coil spring. The urging member positioning boss 202 in the housing body 20 extends through the urging member 4 (refer to FIGS. 3 and 4). The urging member 4 causes the pressing member 3 to return to the reference position when the pressing member 3 is released from the external pressing force.

Fixed Contact

The multiple fixed contacts 5 in a first embodiment or embodiments include a first fixed contact 5*a* and a second fixed contact 5*b* (refer to FIGS. 2 and 4). The first fixed contact 5*a* and the second fixed contact 5*b* in a first embodiment or embodiments both protrude from a lower portion of the housing body 20 and are electrically connectable to the peripheral components of the switch device 1A.

The first fixed contact 5*a* is located on the right (in the +Y direction) in the housing body 20 (refer to FIGS. 2 and 4). The second fixed contact 5*b* is located on the left (in the −Y direction) in the housing body 20 (refer to FIGS. 2 and 4). The second fixed contact 5*b* includes, on its upper end, a contact target 51 with which the movable contact 6 comes in contact.

A resistor such as a chip resistor may be electrically connected between the first fixed contact 5*a* and the second fixed contact 5*b*.

Movable Contact

The movable contact 6 is swingable in a direction intersecting with the movement direction D of the pressing member 3. The movable contact 6 connects and disconnects between the first fixed contact 5*a* and the second fixed contact 5*b*. Connecting and disconnecting refers to switching the state from being electrically connected to being electrically insulated and from being electrically insulated to being electrically connected. The movable contact 6 in a first embodiment or embodiments is electrically connected to the first fixed contact 5*a*. The movable contact 6 comes in contact with and separates from the second fixed contact 5*b* to connect and disconnect between the first fixed contact 5*a* and the second fixed contact 5*b*.

The movable contact 6 in a first embodiment or embodiments includes an arm 60 and a contact point 61 (refer to FIGS. 2 and 4).

The arm 60 in a first embodiment or embodiments is squared U-shaped (substantially U-shaped) in the right-left direction (Y direction) in a plan view and opens toward the center of the housing body 20 (refer to FIG. 4). The arm 60 has a right end (in the +Y direction) electrically connected to the first fixed contact 5*a*. In a specific example, the arm 60 receives the first fixed contact 5*a* in a slit 62 in the right end (in the +Y direction) to be electrically connected to the first fixed contact 5*a* (refer to FIG. 2).

The movable contact 6 is swingable in a swing direction S (+S/−S) along the front-rear direction (X direction) with a right corner 65 (in the +Y direction) of the square U-shape of the arm 60 as a basal end (refer to FIG. 4). With the arm 60 functioning as a leaf spring, the movable contact 6 returns to its natural state under no load.

The contact point 61 (610, 611) in a first embodiment or embodiments comes in contact with and separates from the second fixed contact 5*b*. The contact point 61 (610, 611) is bifurcated from the left end (in the −Y direction) of the arm 60 like a fork (refer to FIG. 4). The contact point 61 (610, 611) is away from the second fixed contact 5*b* when the arm 60 is under no load (refer to FIGS. 2 to 4).

The contact points 610 and 611 are both U-shaped and open upward (+Z direction). The contact point 611 is located inward from the contact point 610. The contact point 611, which is nearer the basal end for the movable contact 6 to swing than the contact point 610, has a smaller width than the contact point 610 (refer to FIG. 4), which equalizes the frictional force between the contact point 610 and the second fixed contact 5*b* and the frictional force between the contact point 611 and the second fixed contact 5*b*. The contact point 61 (610, 611) can thus come in contact with and separate from the second fixed contact 5*b* smoothly.

A specific example of the movable contact 6 in a first embodiment or embodiments connecting and disconnecting between the first fixed contact 5*a* and the second fixed contact 5*b* will now be described with reference to FIG. 4.

The movable contact 6 in a first embodiment or embodiments described above swings in the +S direction with the corner 65 as a basal end upon receiving a pressing force on the arm 60 in the −X direction. The movable contact 6 swinging in the +S direction causes the contact point 61 in the movable contact 6, which has been away from the second fixed contact 5*b*, to come in contact with the contact target 51 in the second fixed contact 5*b*. The movable contact 6 electrically connected to the first fixed contact 5*a* coming in contact with the second fixed contact 5*b* electrically connects the first fixed contact 5*a* and the second fixed contact 5*b*. The movable contact 6 swings in the −S direction to return to its natural state upon being released from the pressing force in the −X direction to be under no load. The movable contact 6 swinging in the −S direction causes the contact point 61 in the movable contact 6, which has been in contact with the second fixed contact 5*b*, to separate from the second fixed contact 5*b*. The movable contact 6 electrically connected to the first fixed contact 5*a* separating from the second fixed contact 5*b* insulates the first fixed contact 5*a* and the second fixed contact 5*b* from each other. Accordingly, the movable contact 6 connects and disconnects between the first fixed contact 5*a* and the second fixed contact 5*b*.

As described above, the movable contact 6 including the multiple contact points 61 (610, 611) allows electrical connection between the first fixed contact 5*a* and the second fixed contact 5*b* with the contact point 611 when, for example, the contact point 610 oxidizes and fails to electrically connect with the second fixed contact 5*b*. Thus, providing multiple contact points increases the reliability of contact between the first fixed contact 5*a* and the second fixed contact 5*b*.

The first fixed contact 5*a* and the second fixed contact 5*b* in a first embodiment or embodiments are insert-molded to be integral with the housing body 20.

Operation of Switch Device

The operation of the switch device 1A according to a first embodiment or embodiments will now be described.

Figure 6:
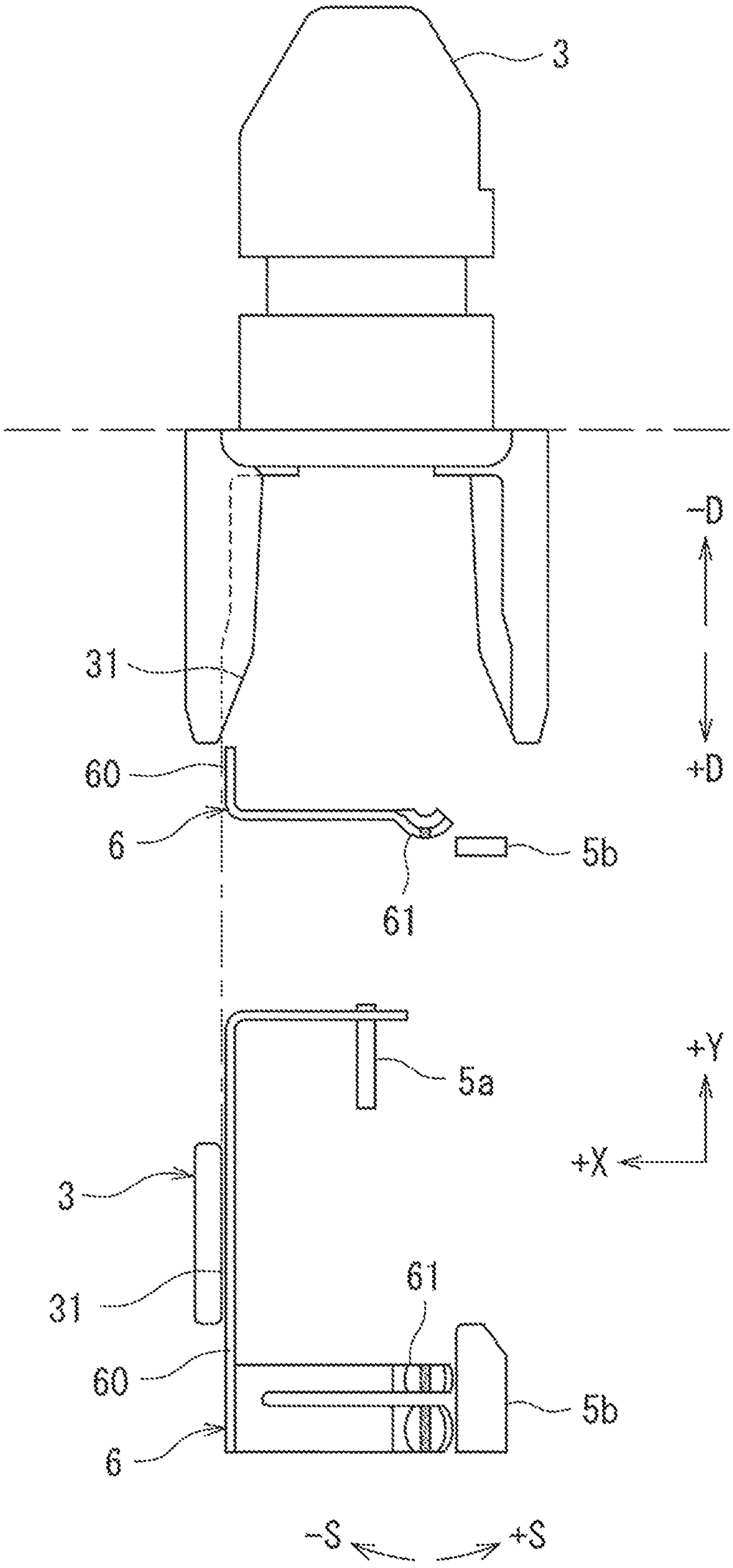
FIG. 6 is a diagram illustrating a schematic side view and a schematic plan view of a portion including a first fixed contact and a second fixed contact insulated from each other in a first embodiment or embodiments.
Figure 7:
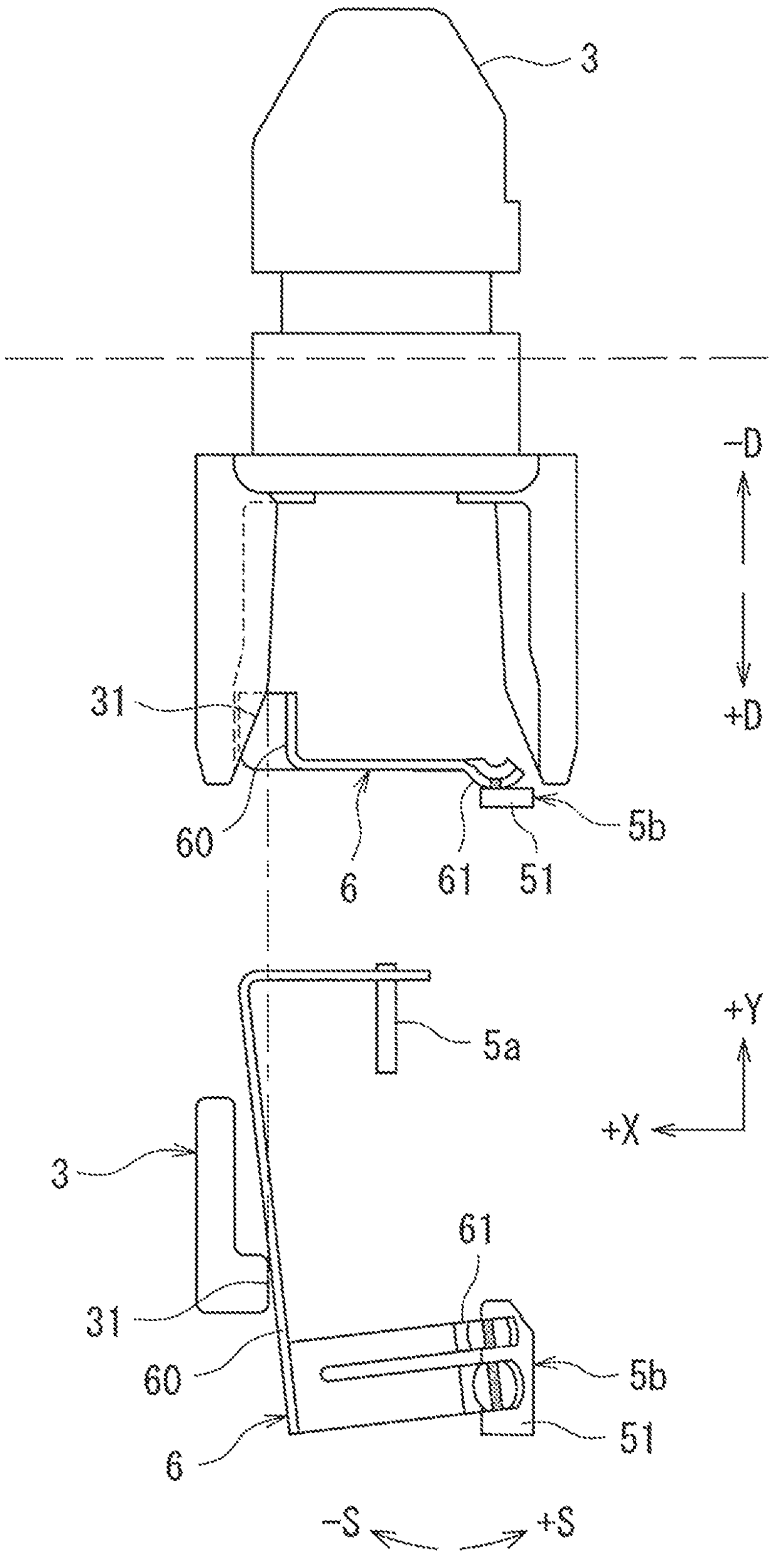
FIG. 7 is a diagram illustrating a schematic side view and a schematic plan view of a portion including a first fixed contact and a second fixed contact electrically connected with each other in a first embodiment or embodiments.

FIG. 6 is a schematic side view and a schematic plan view of a portion including the first fixed contact 5*a* and the second fixed contact 5*b* in a first embodiment or embodiments insulated from each other. FIG. 7 is a schematic side view and a schematic plan view of the portion including the first fixed contact 5*a* and the second fixed contact 5*b* in a first embodiment or embodiments electrically connected with each other. In the figures, the dot-and-dash line in the vertical direction indicates the sliding position of the pressing member 3 with respect to the movable contact 6. In the figures, the dot-and-dash line in the lateral direction conceptually indicates the reference position of the pressing member 3. In the figures, the shaded areas indicate the portions of the contact point 61 in the movable contact 6 that come in contact with the second fixed contact 5*b*. The same applies to the embodiments described below.

As shown in FIG. 6, when the pressing member 3 is at the reference position, the movable contact 6 is under no load, with the contact point 61 in the movable contact 6 away from the second fixed contact 5*b*. The first fixed contact 5*a* and the second fixed contact 5*b* are thus insulated from each other.

The pressing member 3 is guided along the guide groove 201 on the housing 2 to move to the pressed position in the +D direction upon receiving an external pressing force as shown in FIG. 7. As the pressing member 3 moves to the pressed position, the slider portion 31 slides along the rear (in the +X direction) of the arm 60 in the movable contact 6. When the pressing member 3 has its portion sliding along the arm 60 in the movable contact 6, the arm 60 slides in the diagonal direction defined by the −X and +Z directions relative to the pressing member 3 and is also pressed by the slider portion 31 in the −X direction. The movable contact 6 swings in the +S direction, or more specifically, in the direction intersecting with the movement direction D of the pressing member 3 under the pressing force in the −X direction from the slider portion 31. The movable contact 6 swinging in the +S direction causes the contact point 61 in the movable contact 6 electrically connected to the first fixed contact 5*a* to come in contact with the contact target 51 in the second fixed contact 5*b*. The first fixed contact 5*a* and the second fixed contact 5*b* are thus electrically connected.

The pressing member 3 moves in the −D direction under the urging force from the urging member 4 to return to the reference position as shown in FIG. 6 upon being released from the external pressing force. The pressing member 3 has its portion stopping sliding along the movable contact 6, and the movable contact 6 is released from the pressing force in the −X direction from the slider portion 31 to swing in the −S direction. The movable contact 6 swinging in the −S direction causes the contact point 61 in the movable contact 6 to separate from the second fixed contact 5*b*. The first fixed contact 5*a* and the second fixed contact 5*b* are thus insulated from each other again.

As described above, the movable contact 6 is pressed by the slider portion 31 in the pressing member 3 sliding along the movable contact 6 as the pressing member 3 moves from the reference position to the pressed position. Pressing causes the movable contact 6 to swing and come in contact with and separate from the second fixed contact 5*b* that is one of the multiple fixed contacts 5 (5*a*, 5*b*), thus connecting and disconnecting between the first fixed contact 5*a* and the second fixed contact 5*b*.

The ratio of the distance by which the pressing member 3 moves in the movement direction D and the distance by which the movable contact 6 slides along the slider portion 31 is approximate to cos(ω):1, where w is the angle at which the slider portion 31 is oblique to the movement direction D of the pressing member 3. The slider portion 31 extends in a direction defined by the +sin(ω) and +cos(ω) directions. The movable contact 6 thus slides along the slider portion 31 in the direction defined by the +sin(ω) and +cos(ω) directions relative to the pressing member 3 and is also pressed by the slider portion 31 in the +sin(ω) direction to swing. In other words, the ratio of the distance by which the pressing member 3 moves in the movement direction D and the distance by which the movable contact 6 moves in the swing direction S is approximate to 1:tan(ω). The distance by which the movable contact 6 moves in the swing direction S is thus shorter than the distance by which the pressing member 3 moves in the movement direction D. The movable contact 6 moving by a shorter distance slides on the second fixed contact **5*b* by a shorter distance, thus reducing the wear of the second fixed contact 5*b*, reducing the likelihood of lower reliability of contact between the movable contact 6 and the second fixed contact 5*b***.

The slider portion 31 may have a shape other than the shape described above. For example, the slider portion 31 may have a plane, a curved surface, or an uneven surface. In other words, the slider portion 31 may have any shape that can cause the distance by which the movable contact 6 moves in the swing direction S to be shorter than the distance by which the pressing member 3 moves in the movement direction D. The angle ω between the movement direction D of the pressing member 3 and the direction in which the slider portion 31 is oblique to the movement direction D is not limited to the above example, and may vary, for example, depending on the distance by which the pressing member 3 moves. The slider portion 31 may extend in a direction other than the direction described above. The slider portion 31 may extend in, for example, a diagonal direction defined by the +X and +Z directions or by the Y and Z directions.

In a first embodiment or embodiments described above, the slider portion 31 has the first inclined surface 310 and the second inclined surface 311 extending in the directions that are oblique at different angles to the movement direction D of the pressing member 3. Thus, when the pressing member 3 moves from the reference position to the pressed position, the slider portion 31 slides along the movable contact 6 first with its first inclined surface 310 and then with its second inclined surface 311. The first inclined surface 310 is inclined at the angle θ with the movement direction D of the pressing member 3. The second inclined surface 311 is inclined at the angle φ with the movement direction D of the pressing member 3. The movable contact 6 thus moves in the swing direction S by different distances on the first inclined surface 310 and the second inclined surface 311. As described above, the slider portion 31 has the multiple inclined surfaces (the first inclined surface 310 and the second inclined surface 311) extending in the directions that are oblique at different angles to the movement direction D of the pressing member 3. The simple structure allows the distance by which the movable contact 6 moves in the swing direction S to be changeable depending on the distance by which the pressing member 3 moves.

In a first embodiment or embodiments, the pressing member 3 has its portion sliding along the movable contact 6 along the second inclined surface 311 of the slider portion 31 when the movable contact 6 comes in contact with the second fixed contact **5*b*. As described above, the first inclined surface 310 extends in the direction oblique at the angle θ to the movement direction D of the pressing member 3. The second inclined surface 311 extends in the direction oblique at the angle φ smaller than the angle θ to the movement direction D of the pressing member 3**.

The above ratio of the distance by which the pressing member 3 moves in the movement direction D and the distance by which the movable contact 6 moves in the swing direction S may be applied. Accordingly, the ratio of the distance by which the movable contact 6 moves in the swing direction S when the movable contact 6 is in contact with the second fixed contact **5*b* and the distance by which the movable contact 6 moves in the swing direction S when the movable contact 6 is not in contact with any of the fixed contacts 5 is approximate to tan((φ):tan(θ). The distance by which the movable contact 6 moves in the swing direction S when the movable contact 6 is in contact with the second fixed contact 5*b* is thus shorter than the distance by which the movable contact 6 moves in the swing direction S when the movable contact 6 is not in contact with any of the fixed contacts 5, causing the movable contact 6, which has come in contact with the second fixed contact 5*b*, to slide on the second fixed contact 5*b* by a shorter distance, thus reducing the wear of the second fixed contact 5*b*. Accordingly, the likelihood of lower reliability of contact between the movable contact 6 and the second fixed contact 5*b*** is reduced.

In a first embodiment or embodiments described above, the movable contact 6 slides on the second fixed contact **5*b* by a shorter distance, thus allowing downsizing of the switch device 1**A.

In a first embodiment or embodiments described above, the movable contact 6 includes the arm 60 electrically connected to the first fixed contact **5*a* that is one of the multiple fixed contacts 5 (5*a*, 5*b*). The arm 60 is pressed by the slider portion 31 in the pressing member 3 sliding along the movable contact 6, causing the movable contact 6 to swing and come in contact with and separate from the second fixed contact 5*b* that is the other fixed contact. The movable contact 6 includes the arm 60. The simple structure allows the movable contact 6 to be swingable. The movable contact 6 is swingable by the slider portion 31 in the pressing member 3 sliding along the arm 60. The simple structure allows connection and disconnection between the first fixed contact 5*a* and the second fixed contact 5*b***.

The contact target 51 in the second fixed contact **5*b* with which the movable contact 6 comes in contact may be coated with, for example, plating for corrosion resistance. In a first embodiment or embodiments described above, the movable contact 6 slides on the second fixed contact 5*b* by a shorter distance, which reduces the plated area of the second fixed contact 5*b***, thus reducing the production costs.

As described above, the switch device 1A according to a first embodiment or embodiments may be a normally open (NO) switch.

Second Embodiment

A switch device 1B according to a second embodiment will now be described focusing on its differences from a first embodiment or embodiments described above.

Figure 8:
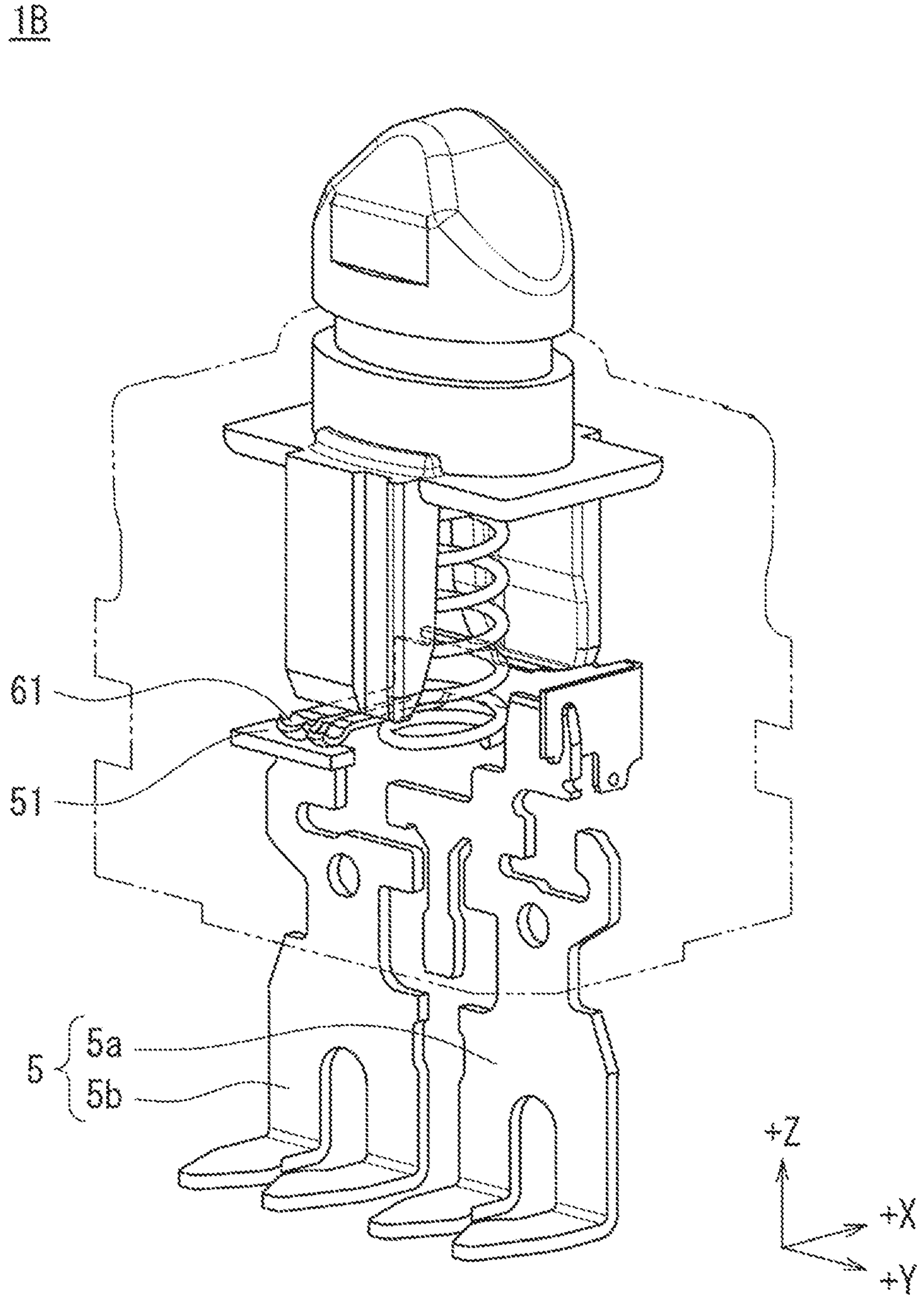
FIG. 8 is a diagram illustrating a transparent perspective view of a switch device according to a second embodiment or embodiments, showing an example internal structure.
Figure 9:
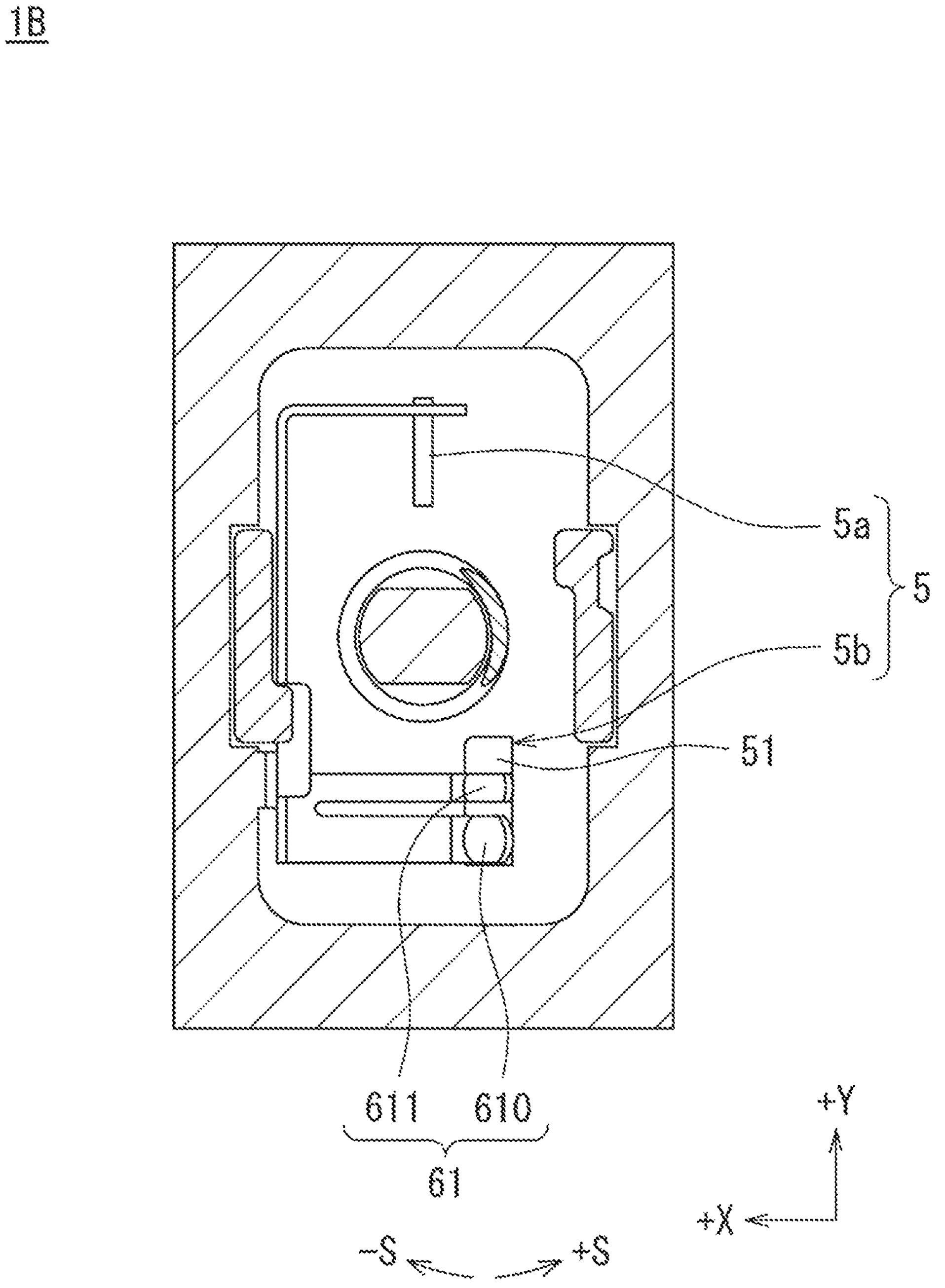
FIG. 9 is a diagram illustrating a plan view of a switch device, such as is shown in FIG. 8 viewed from above, showing an internal structure.

FIG. 8 is a transparent perspective view of the switch device 1B according to a second embodiment or embodiments, showing its example internal structure. FIG. 9 is a plan view of the switch device 1B in FIG. 8 viewed from above, showing the internal structure.

A contact point 61 (610, 611) in a second embodiment or embodiments is in contact with a contact target 51 in a second fixed contact **5*b* when an arm 60** is under no load.

A specific example of a movable contact 6 in a second embodiment or embodiments connecting and disconnecting between a first fixed contact 5*a* and the second fixed contact 5*b* will now be described with reference to FIG. 9.

The movable contact 6 in a second embodiment or embodiments described above swings in the +S direction upon receiving a pressing force on the arm 60 in the –X direction. The movable contact 6 swinging in the +S direction causes the contact point 61 in the movable contact 6, which has been in contact with the second fixed contact 5*b*, to separate from the second fixed contact 5*b*. The movable contact 6 electrically connected to the first fixed contact 5*a* separating from the second fixed contact 5*b* insulates the first fixed contact 5*a* and the second fixed contact 5*b* from each other. The movable contact 6 swings in the –S direction to return to its natural state upon being released from the pressing force in the –X direction to be under no load. The movable contact 6 swinging in the –S direction causes the contact point 61 in the movable contact 6, which has been away from the second fixed contact 5*b*, to come in contact with the second fixed contact 5*b*. The movable contact 6 electrically connected to the first fixed contact 5*a* coming in contact with the second fixed contact 5*b* electrically connects the first fixed contact 5*a* and the second fixed contact 5*b*. Accordingly, the movable contact 6 connects and disconnects between the first fixed contact 5*a* and the second fixed contact 5*b*.

The operation of the switch device 1B according to a second embodiment or embodiments will now be described.

Figure 10:
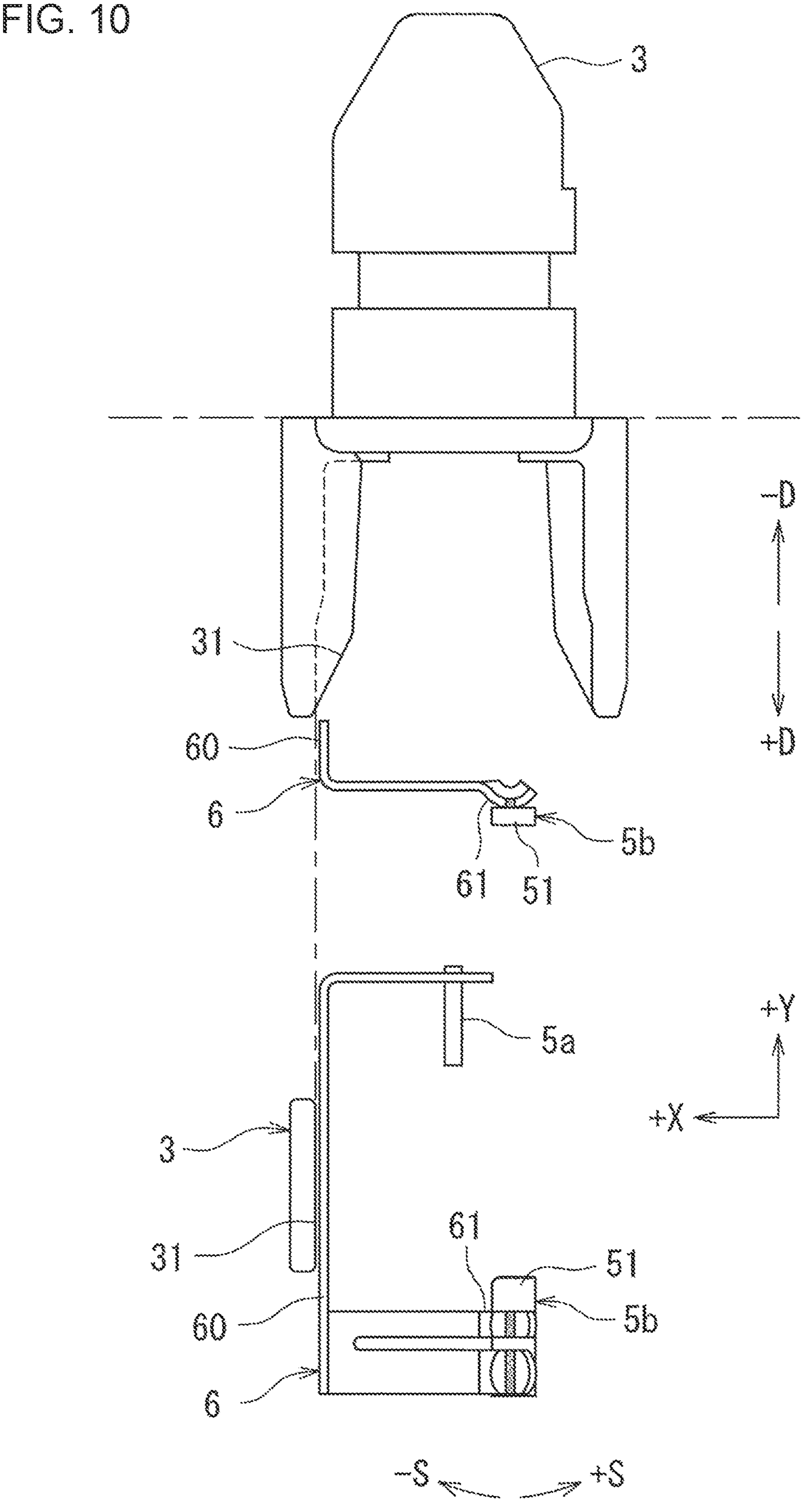
FIG. 10 is a diagram illustrating a schematic side view and a schematic plan view of a portion including a first fixed contact and a second fixed contact electrically connected with each other in a second embodiment or embodiments.
Figure 11:
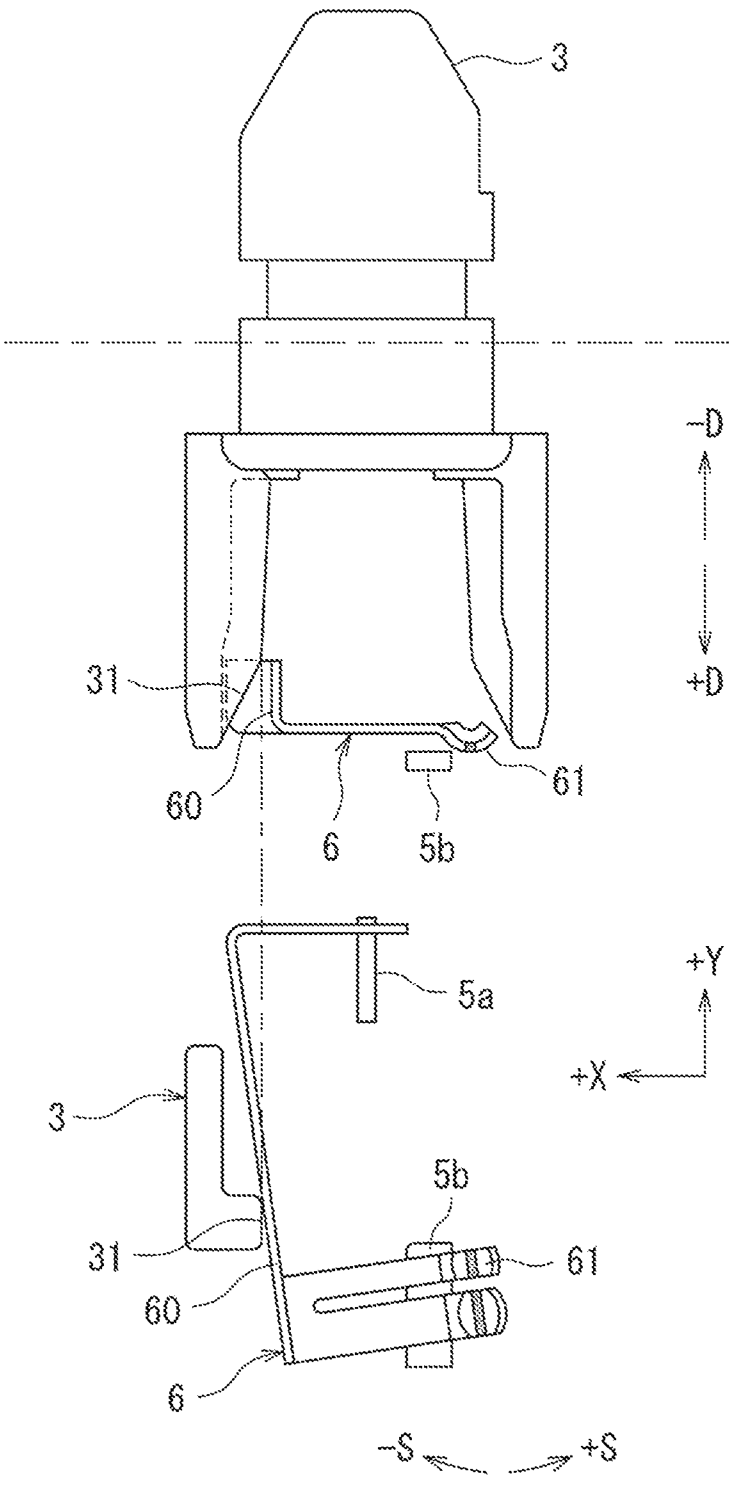
FIG. 11 is a diagram illustrating a schematic side view and a schematic plan view of a portion including a first fixed contact and a second fixed contact insulated from each other in a second embodiment or embodiments.

FIG. 10 is a schematic side view and a schematic plan view of a portion including the first fixed contact 5*a* and the second fixed contact 5*b* in a second embodiment or embodiments electrically connected with each other. FIG. 11 is a schematic side view and a schematic plan view of the portion including the first fixed contact 5*a* and the second fixed contact 5*b* in a second embodiment or embodiments insulated from each other.

As shown in FIG. 10, when a pressing member 3 is at the reference position, the movable contact 6 is under no load, with the contact point 61 in the movable contact 6 in contact with the contact target 51 in the second fixed contact 5*b*. The first fixed contact 5*a* and the second fixed contact 5*b* are thus electrically connected with each other.

The pressing member 3 moves to the pressed position in the +D direction upon receiving an external pressing force as shown in FIG. 11. As the pressing member 3 moves to the pressed position, a slider portion 31 slides along the arm 60 in the movable contact 6. The movable contact 6 is pressed by the slider portion 31 in the –X direction to swing in the +S direction as the pressing member 3 slides along the movable contact 6. The movable contact 6 swinging in the +S direction causes the contact point 61 in the movable contact 6, which is electrically connected to the first fixed contact 5*a*, to separate from the second fixed contact 5*b*. The first fixed contact 5*a* and the second fixed contact 5*b* are thus insulated from each other.

The pressing member 3 moves in the –D direction under the urging force from the urging member 4 to return to the reference position as shown in FIG. 10 upon being released from the external pressing force. The pressing member 3 has its portion stopping sliding along the movable contact 6, and the movable contact 6 is released from the pressing force in the –X direction from the slider portion 31 to swing in the –S direction. The movable contact 6 swinging in the –S direction causes the contact point 61 in the movable contact 6 to come in contact with the contact target 51 in the second fixed contact 5*b*. The first fixed contact 5*a* and the second fixed contact 5*b* are thus electrically connected with each other again.

As described above, the switch device 1B according to a second embodiment or embodiments may be a normally closed (NC) switch.

Third Embodiment

A switch device 1C according to a third embodiment will now be described focusing on its differences from the above first embodiment.

Figure 12:
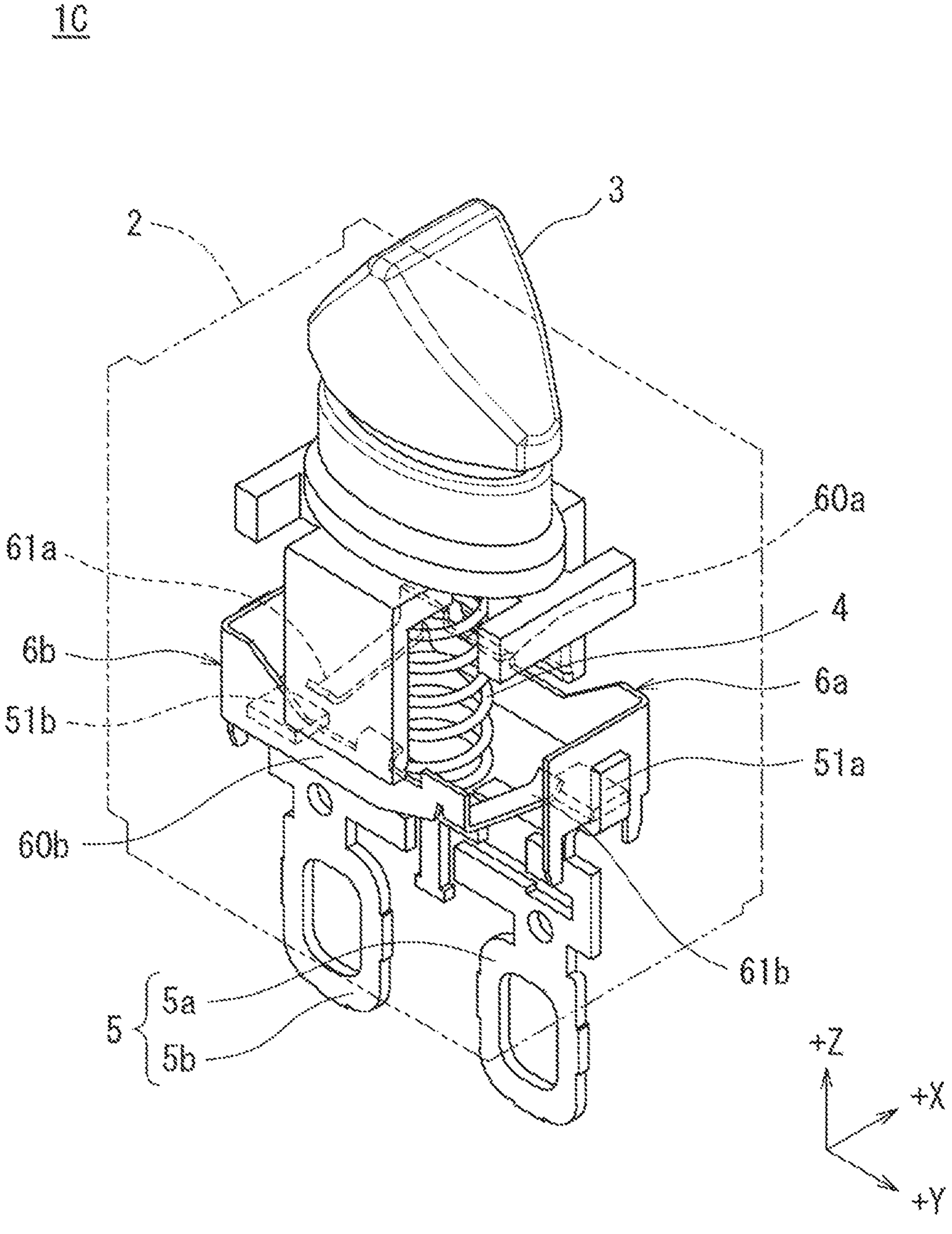
FIG. 12 is a diagram illustrating a transparent perspective view of a switch device according to a third embodiment or embodiments, showing an example internal structure.
Figure 13:
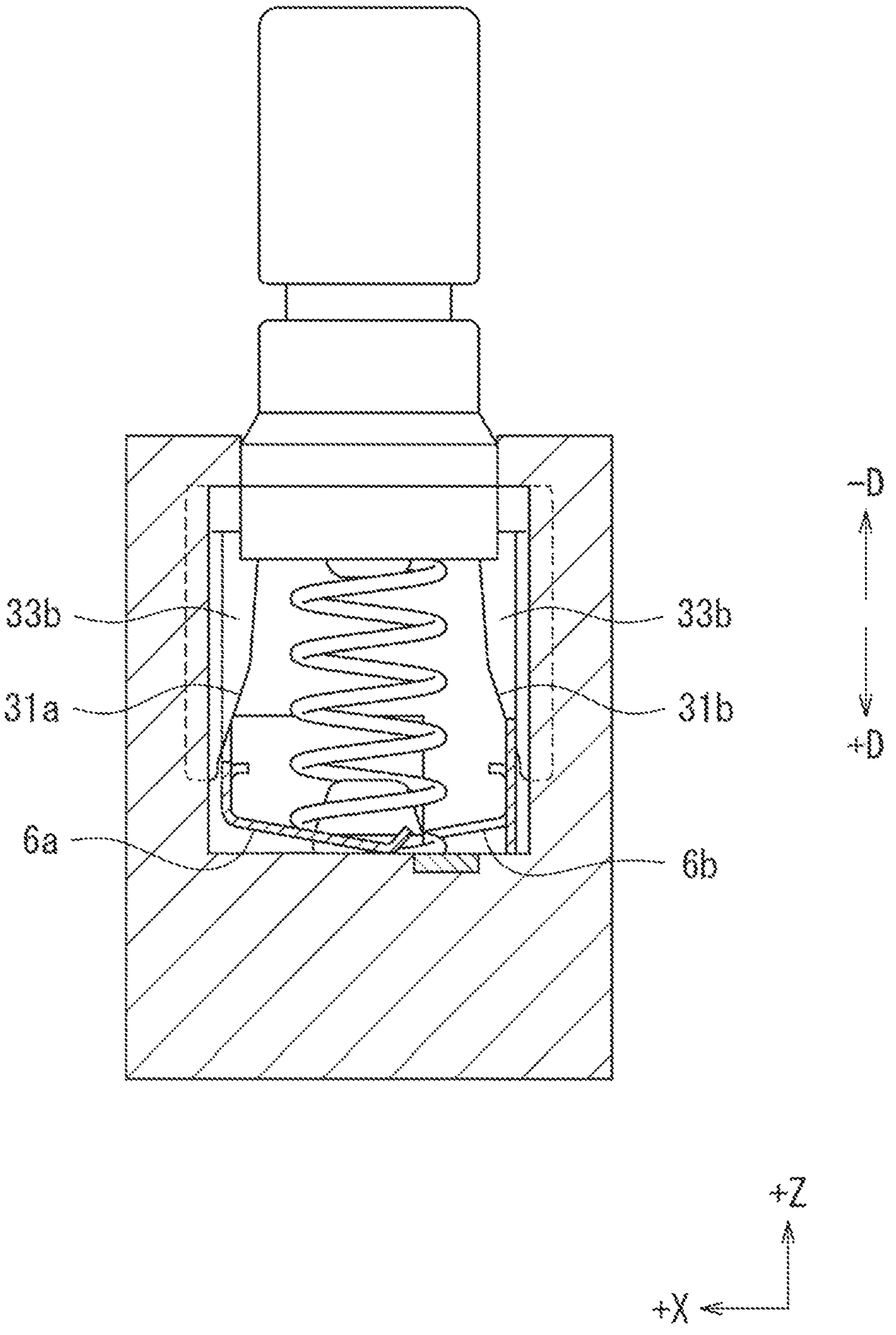
FIG. 13 is a diagram illustrating a side view of a switch device, such as is shown in FIG. 12 viewed from a left side, showing an internal structure.
Figure 14:
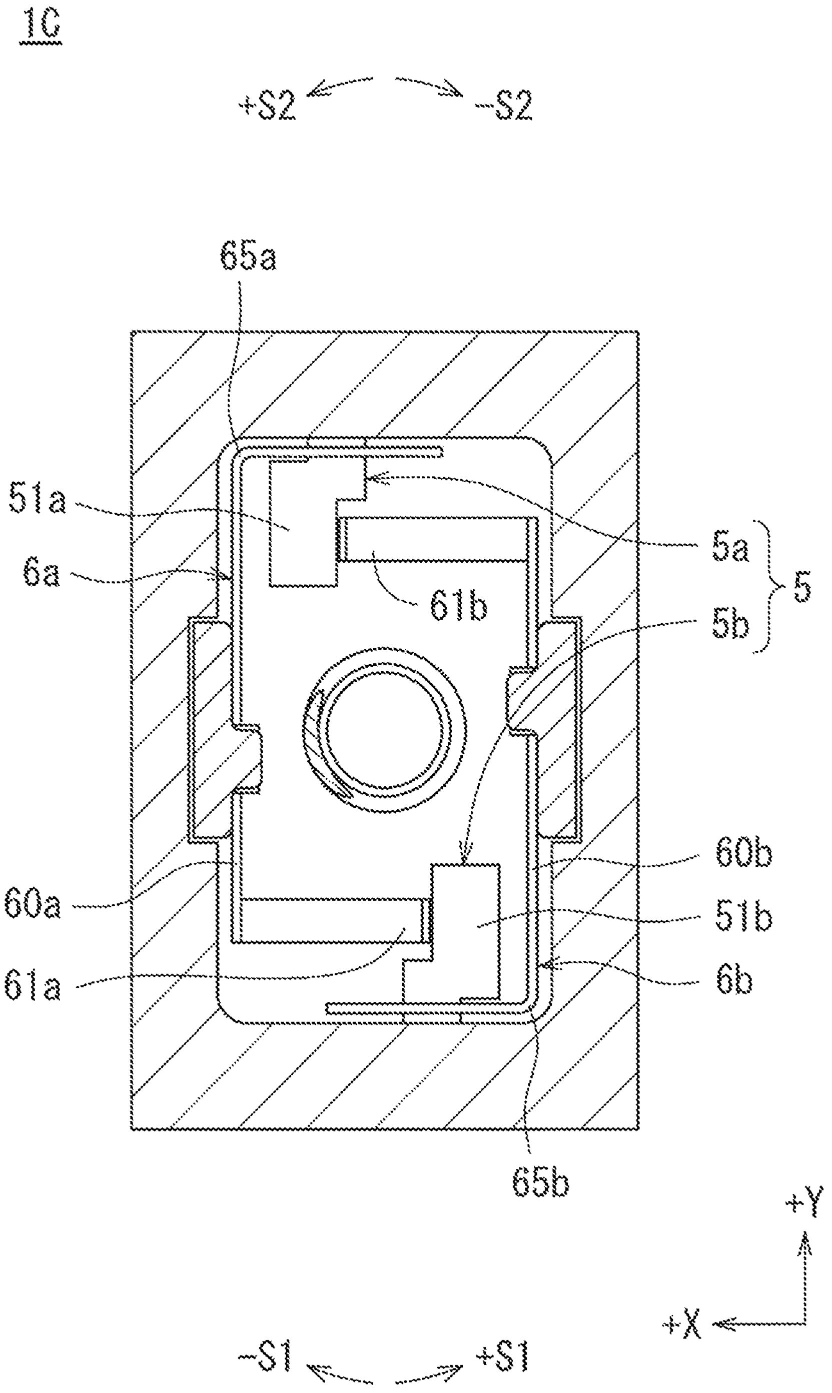
FIG. 14 is a diagram illustrating a plan view of a switch device, such as is shown in FIG. 12 viewed from above, showing an internal structure.

FIG. 12 is a transparent perspective view of the switch device 1C according to a third embodiment or embodiments, showing its example internal structure. FIG. 13 is a side view of the switch device 1C in FIG. 12 viewed from the left, showing the internal structure. FIG. 14 is a plan view of the switch device 1C in FIG. 12 viewed from above, showing the internal structure.

The switch device 1C according to a third embodiment or embodiments includes a housing 2, a pressing member 3, an urging member 4, fixed contacts 5 (5*a*, 5*b*), and a pair of movable contacts 6*a* and 6*b* facing each other (refer to FIG. 12).

The pressing member 3 in a third embodiment or embodiments includes slider portions for the respective movable contacts 6*a* and 6*b*. More specifically, the pressing member 3 includes a slider portion 31*a* slidable along the movable contact 6*a* and a slider portion 31*b* slidable along the movable contact 6*b* (refer to FIG. 13). The slider portion 31*a* is included in the inner side surface of a leg 33*a*, which extends downward from the button 30 along the front inner surface of the housing 2, and extends in the diagonal direction defined by the –X and +Z directions. The slider portion 31*b* is included in the inner side surface of a leg 33*b*, which extends downward from the button 30 along the rear inner surface of the housing 2, and extends in the diagonal direction defined by the +X and +Z directions (refer to FIG. 13).

A specific example of the pressing member 3 in a third embodiment or embodiments having the slider portion 31*a* sliding along the movable contact 6*a* and the slider portion 31*b* sliding along the movable contact 6*b* will now be described with reference to FIG. 13. The slider portion 31*a* in the pressing member 3 comes in contact with the movable contact 6*a* in the +D direction and slides along the movable contact 6*a* as the pressing member 3 moves from the reference position to the pressed position in the +D direction. The movable contact 6*a* slides along the slider portion 31*a* in the diagonal direction defined by the –X and +Z directions relative to the pressing member 3. Similarly, the slider portion 31*b* comes in contact with the movable contact 6*b* in the +D direction and slides along the movable contact 6*b*. The movable contact 6*b* slides along the slider portion 31*b* in the diagonal direction defined by the +X and +Z directions relative to the pressing member 3.

The first fixed contact 5*a* in a third embodiment or embodiments includes, on its upper end, a contact target 51*a* with which the movable contact 6*b* comes in contact. The second fixed contact 5*b* in a third embodiment or embodiments includes, on its upper end, a contact target 51*b* with which the movable contact 6*a* comes in contact (refer to FIGS. 12 and 14).

In a third embodiment or embodiments, the movable contact 6*a* is electrically connected to the first fixed contact 5*a*, and the movable contact 6*b* is electrically connected to the second fixed contact 5*b*. The movable contacts 6*a* and 6*b* come in contact with or separate from the first and second fixed contacts 5*a* and 5*b* to connect and disconnect between the first fixed contact 5*a* and the second fixed contact 5*b*.

The movable contact 6*a* in a third embodiment or embodiments includes an arm 60*a* and a contact point 61*a*. The movable contact 6*b* includes an arm 60*b* and a contact point 61*b* (refer to FIGS. 12 and 14). The arm 60*a* in the movable contact 6*a* has a right end (in the +Y direction) electrically connected to the first fixed contact 5*a*. The arm 60*b* in the movable contact 6*b* has a left end (in the −Y direction) electrically connected to the second fixed contact 5*b* (refer to FIGS. 12 and 14).

The movable contact 6*a* is swingable in a swing direction S1 (+S1/−S1) parallel to the front-rear direction (X direction) with a right corner 65*a* (in the +Y direction) of the square U-shape of the arm 60*a* as a basal end (refer to FIG. 14). Similarly, the movable contact 6*b* is swingable in a swing direction S2 (+S2/−S2) parallel to the front-rear direction (X direction) with a left corner 65*b* (in the −Y direction) of the square U-shape of the arm 60*b* as a basal end (refer to FIG. 14).

The contact point 61*a* is away from the second fixed contact 5*b* when the arm 60*a* is under no load. Similarly, the contact point 61*b* is away from the first fixed contact 5*a* when the arm 60*b* is under no load.

A specific example of the movable contacts 6*a* and 6*b* in a third embodiment or embodiments connecting and disconnecting between the first fixed contact 5*a* and the second fixed contact 5*b* will now be described with reference to FIG. 14.

The movable contact 6*a* in a third embodiment or embodiments described above swings in the +S1 direction with the corner 65*a* as a basal end upon receiving a pressing force on the arm 60*a* in the −X direction. Similarly, the movable contact 6*b* swings in the +S2 direction with the corner 65*b* as a basal end upon receiving a pressing force on the arm 60*b* in the +X direction. The movable contact 6*a* swinging in the +S1 direction causes the contact point 61*a* in the movable contact 6*a*, which has been away from the second fixed contact 5*b*, to come in contact with the contact target 51*b* in the second fixed contact 5*b*, whereas the movable contact 6*b* swinging in the +S2 direction causes the contact point 61*b* in the movable contact 6*b*, which has been away from the first fixed contact 5*a*, to come in contact with the contact target 51*a* in the first fixed contact 5*a*. The first fixed contact 5*a* and the second fixed contact 5*b* come in contact with each other. The first fixed contact 5*a* and the second fixed contact 5*b* are thus electrically connected with each other. The movable contact 6*a* swings in the −S1 direction to return to its natural state upon being released from the pressing force in the −X direction to be under no load. Similarly, the movable contact 6*b* swings in the −S2 direction to return to its natural state upon being released from the pressing force in the +X direction to be under no load. The movable contact 6*a* swinging in the −S1 direction causes the contact point 61*a* in the movable contact 6*a*, which has been in contact with the second fixed contact 5*b*, to separate from the second fixed contact 5*b*. The movable contact 6*b* swinging in the −S2 direction causes the contact point 61*b* in the movable contact 6*b*, which has been in contact with the first fixed contact 5*a*, to separate from the first fixed contact 5*a*. The first fixed contact 5*a* and the second fixed contact 5*b* separate from each other. The first fixed contact 5*a* and the second fixed contact 5*b* are thus insulated from each other. Accordingly, the movable contact 6 connects and disconnects between the first fixed contact 5*a* and the second fixed contact 5*b*.

As described above, the switch device 1C including the multiple movable contacts (the movable contact 6*a* and the movable contact 6*b*) allows electrical connection between the first fixed contact 5*a* and the second fixed contact 5*b* with the movable contact 6*b* when, for example, the movable contact 6*a* oxidizes and fails to electrically connect between the first fixed contact 5*a* and the second fixed contact 5*b*. Thus, the use of multiple movable contact increases the reliability of contact between the first fixed contact 5*a* and the second fixed contact 5*b*.

The operation of the switch device 1C according to a third embodiment or embodiments will now be described.

Figure 15:
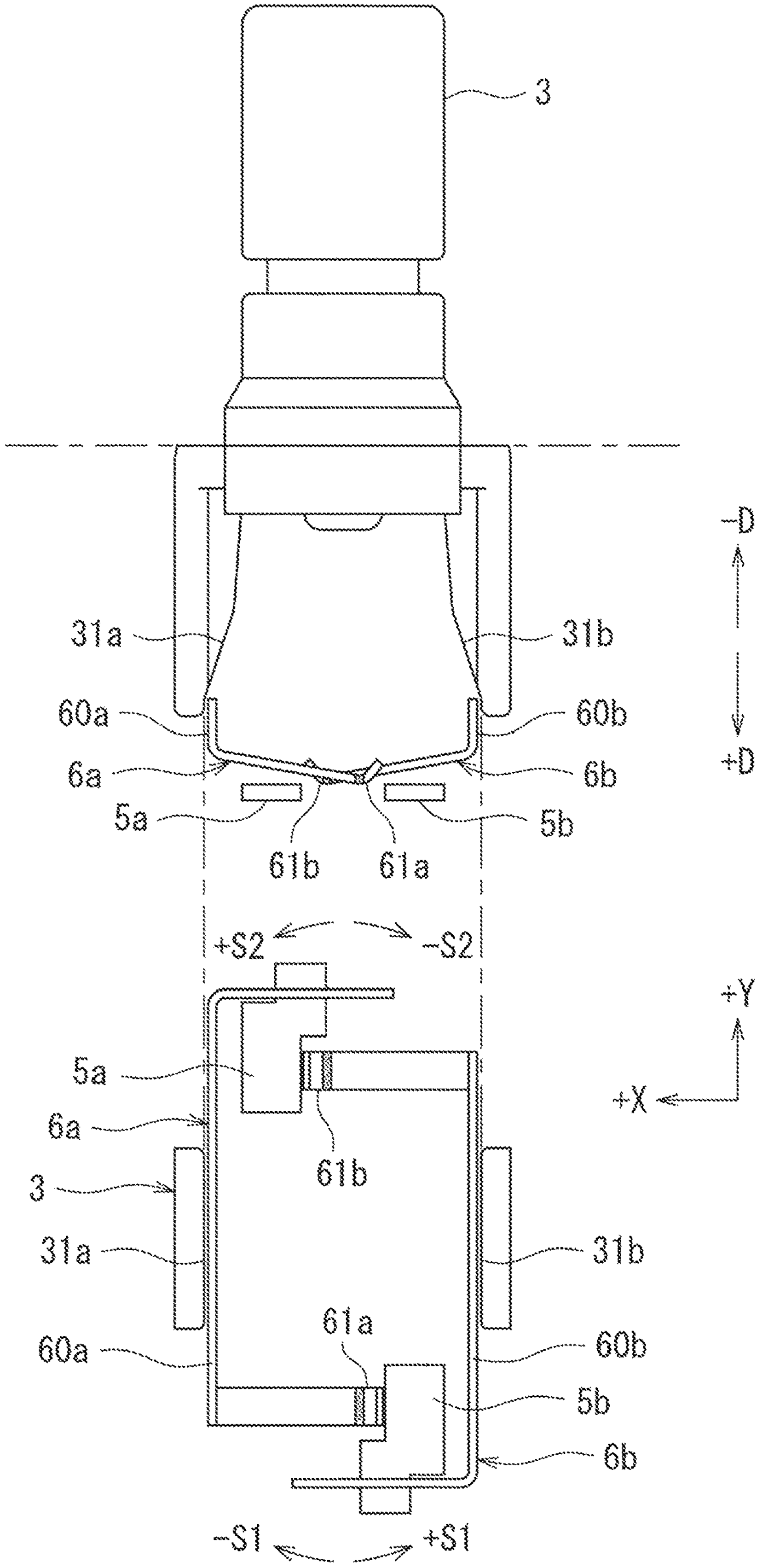
FIG. 15 is a diagram illustrating a schematic side view and a schematic plan view of a portion including a first fixed contact and a second fixed contact insulated from each other in a third embodiment or embodiments.
Figure 16:
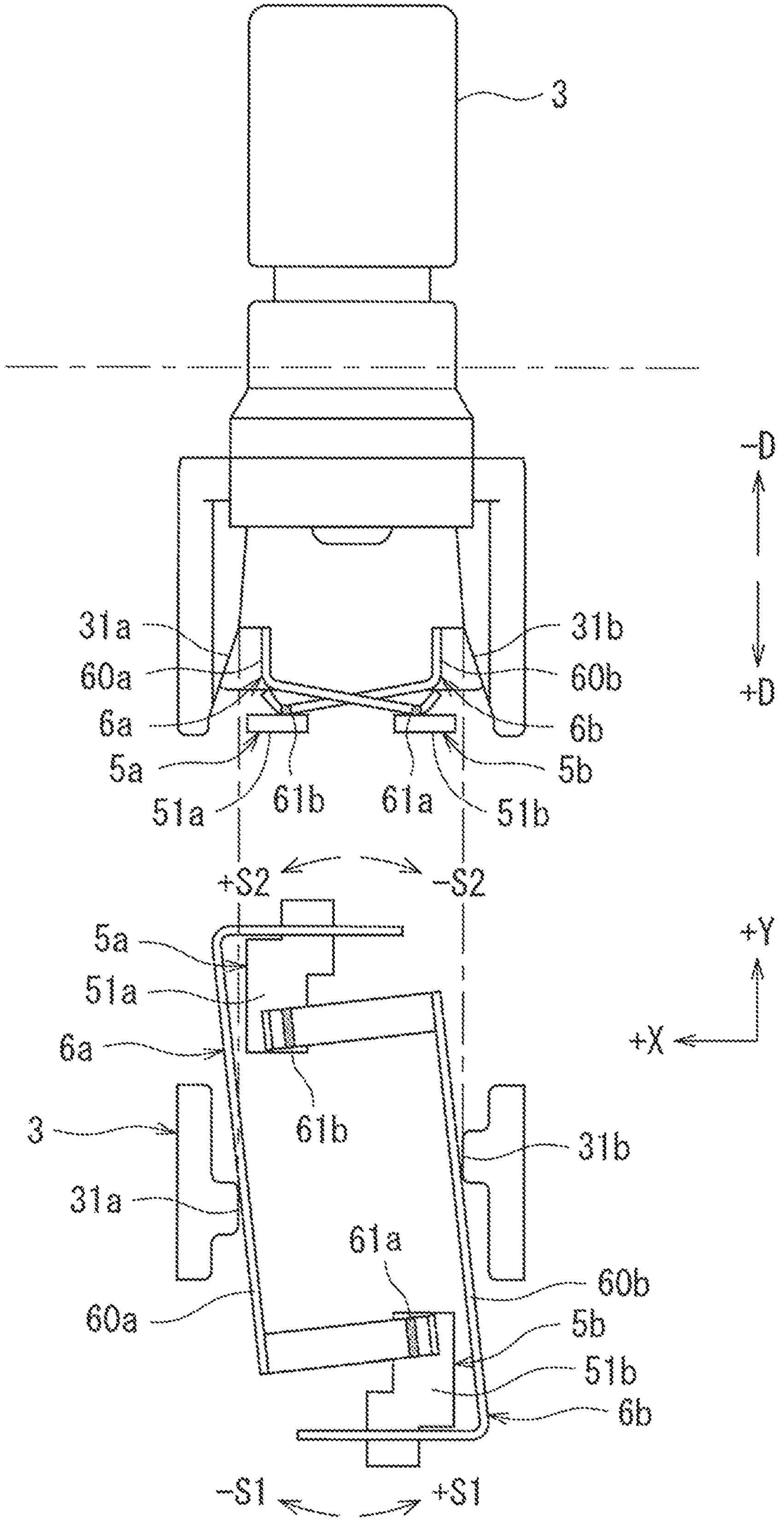
FIG. 16 is a diagram illustrating a schematic side view and a schematic plan view of a portion including a first fixed contact and a second fixed contact electrically connected with each other in a third embodiment or embodiments.

FIG. 15 is a schematic side view and a schematic plan view of a portion including the first fixed contact 5*a* and the second fixed contact 5*b* in a third embodiment or embodiments insulated from each other. FIG. 16 is a schematic side view and a schematic plan view of the portion including the first fixed contact 5*a* and the second fixed contact 5*b* in a third embodiment or embodiments electrically connected with each other.

As shown in FIG. 15, when the pressing member 3 is at the reference position, the movable contacts 6*a* and 6*b* are both under no load, with the movable contacts 6*a* and 6*b* away from each other. The first fixed contact 5*a* and the second fixed contact 5*b* are thus insulated from each other.

The pressing member 3 is guided along a guide groove 201 on the housing 2 to move to the pressed position in the +D direction upon receiving an external pressing force as shown in FIG. 16. As the pressing member 3 moves to the pressed position, the slider portion 31*a* slides along the rear (in the +X direction) of the arm 60*a* in the movable contact 6*a* and the slider portion 31*b* slides along the front (in the −X direction) of the arm 60*b* in the movable contact 6*b*. When the pressing member 3 has its portion sliding along the arm 60*a* in the movable contact 6*a*, the arm 60*a* slides in the diagonal direction defined by the −X and +Z directions relative to the pressing member 3 and is also pressed by the slider portion 31*a* in the −X direction. The movable contact 6*a* swings in the +S1 direction under the pressing force in the −X direction from the slider portion 31*a*. Similarly, when the pressing member 3 has its portion sliding along the arm 60*b* in the movable contact 6*b*, the arm 60*b* slides in the diagonal direction defined by the +X and +Z directions relative to the pressing member 3 and is also pressed by the slider portion 31*b* in the +X direction. The movable contact 6*b* swings in the +S2 direction under the pressing force in the +X direction from the slider portion 31*b*.

The movable contact 6*a* swinging in the +S1 direction causes the contact point 61*a* in the movable contact 6*a* to come in contact with the contact target 51*b* in the second fixed contact 5*b*, whereas the movable contact 6*b* swinging in the +S2 direction causes the contact point 61*b* in the movable contact 6*b* to come in contact with the contact target 51*a* in the first fixed contact 5*a*. In other words, the first fixed contact 5*a* and the second fixed contact 5*b* come in contact with each other to be electrically connected with each other.

The pressing member 3 moves in the −D direction under the urging force from the urging member 4 to return to the reference position as shown in FIG. 15 upon being released from the external pressing force. The pressing member 3 has its portion stopping sliding along the movable contact 6, and the movable contact 6*a* is released from the pressing force in the −X direction from the slider portion 31*a* to swing in the −S1 direction. Similarly, the movable contact 6*b* is released from the pressing force in the +X direction from the slider portion 31*b* to swing in the −S2 direction. The movable contact 6*a* swinging in the −S1 direction and the movable contact 6*b* swinging in the −S2 direction cause the first fixed contact 5*a* and the second fixed contact 5*b* to separate from each other. The first fixed contact 5*a* and the second fixed contact 5*b* are thus insulated from each other again.

In a third embodiment or embodiments described above, the pressing member 3 including the slider portions for the respective movable contacts (the movable contacts 6*a* and 6*b*) can cause the multiple movable contacts (the movable contacts 6*a* and 6*b*) to swing independently. Accordingly, the design flexibility of the switch device 1C can be increased.

As described above, the switch device 1C includes the pair of movable contacts 6*a* and 6*b*, and the pressing member 3 includes a pair of slider portions 31*a* and 31*b*. Accordingly, as the pressing member 3 moves from the reference position to the pressed position, the pair of slider portions 31*a* and 31*b* are each allowed to slide along the respective movable contacts 6*a* and 6*b* in a well-balanced manner, thus increasing the stability in pressing the pressing member 3.

As described above, the switch device 1C according to a third embodiment or embodiments may be a NO switch.

Fourth Embodiment

A switch device according to a fourth embodiment will now be described focusing on its differences from the above first embodiment.

Figure 17:
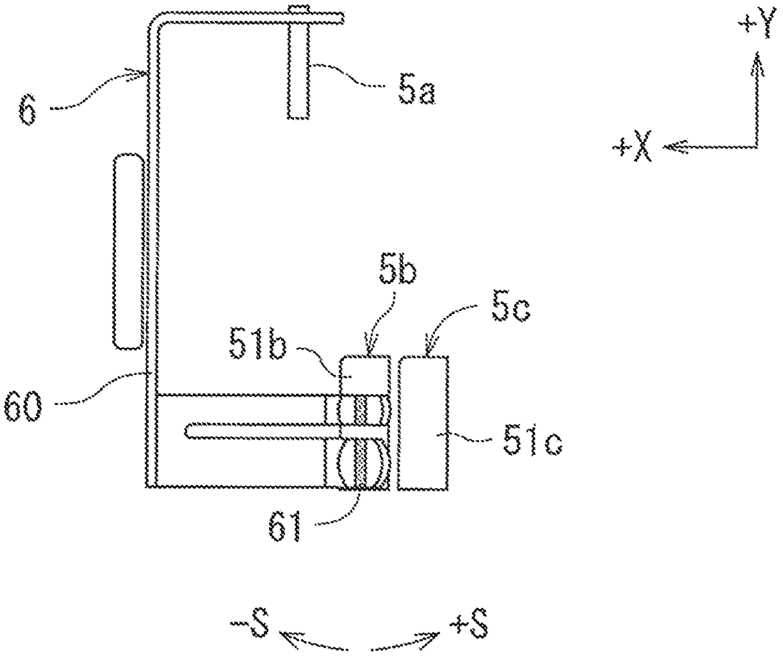
FIG. 17 is a diagram illustrating a schematic plan view of a portion including a first fixed contact and a second fixed contact electrically connected with each other in a fourth embodiment or embodiments.
Figure 18:
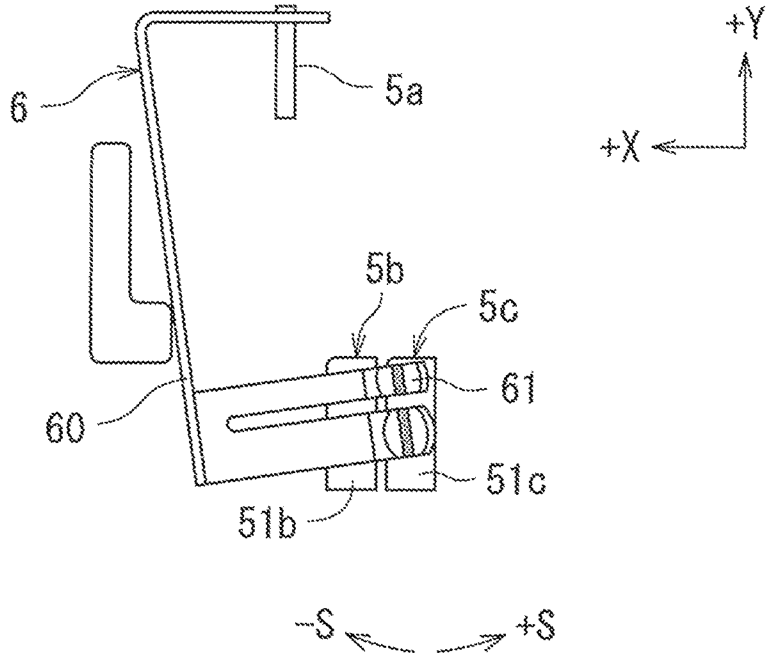
FIG. 18 is a diagram illustrating a schematic plan view of a portion including a first fixed contact and a third fixed contact electrically connected with each other in a fourth embodiment or embodiments.

FIG. 17 is a schematic plan view of a portion including a first fixed contact 5*a* and a second fixed contact 5*b* in a fourth embodiment electrically connected with each other. FIG. 18 is a schematic plan view of the portion including the first fixed contact 5*a* and a third fixed contact 5*c* in a fourth embodiment or embodiments electrically connected with each other.

The fixed contact 5 in a fourth embodiment or embodiments includes the first fixed contact 5*a*, the second fixed contact 5*b*, and a third fixed contact 5*c* (refer to FIGS. 17 and 18). The second fixed contact 5*b* includes a contact target 51*b* located on the left (in the −Y direction) in a housing body 20. The third fixed contact 5*c* includes a contact target 51*c* in front of the contact target 51*b* (in the −X direction) in the second fixed contact 5*b* (refer to FIGS. 17 and 18).

A movable contact 6 in a fourth embodiment or embodiments is electrically connected to the first fixed contact 5*a*. The movable contact 6 comes in contact with and separates from the second fixed contact 5*b* and the third fixed contact 5*c* to connect and disconnect between the second fixed contact 5*b* and the third fixed contact 5*c*.

A contact point 61 in a fourth embodiment or embodiments is in contact with the second fixed contact 5*b* when an arm 60 is under no load.

A specific example of the movable contact 6 in a fourth embodiment or embodiments connecting and disconnecting between the second fixed contact 5*b* and the third fixed contact 5*c* will now be described with reference to FIGS. 17 and 18.

The movable contact 6 in a fourth embodiment or embodiments described above swings in the +S direction upon receiving a pressing force on the arm 60 in the −X direction. The movable contact 6 swinging in the +S direction causes the contact point 61 in the movable contact 6, which has been in contact with the second fixed contact 5*b*, to separate from the second fixed contact 5*b* and come in contact with the contact target 51*c* in the third fixed contact 5*c* (refer to FIG. 18). The movable contact 6 electrically connected to the first fixed contact 5*a* separating from the second fixed contact 5*b* and coming in contact with the third fixed contact 5*c* insulates the first fixed contact 5*a* and the second fixed contact 5*b* and also electrically connects the first fixed contact 5*a* and the third fixed contact 5*c*. The movable contact 6 swings in the −S direction to return to its natural state upon being released from the pressing force in the −X direction to be under no load. The movable contact 6 swinging in the −S direction causes the contact point 61 in the movable contact 6, which has been in contact with the third fixed contact 5*c*, to separate from the third fixed contact 5*b* and come in contact with the contact target 51*b* in the second fixed contact 5*b* (refer to FIG. 17). The movable contact 6 electrically connected to the first fixed contact 5*a* separating from the third fixed contact 5*c* and coming in contact with the second fixed contact 5*b* electrically connects the first fixed contact 5*a* and the second fixed contact 5*b* and also insulates the first fixed contact 5*a* and the third fixed contact 5*c*. Accordingly, the movable contact 6 connects and disconnects between the first fixed contact 5*a* and the second fixed contact 5*b*.

As described above, the switch device according to a fourth embodiment or embodiments may be a double throw switch.

In the first to fourth embodiments described above, a single-pole switch is described as an example of the switch device. However, the switch device according to the embodiments of the present disclosure may be a multi-pole switch.

The embodiments and examples described above are mere examples in all respects and should not be construed to be restrictive. The technical scope is not construed by the embodiments and examples described above and is defined by the claims. All changes that come within the meaning and range of equivalency of the claims fall within the claims.

The invention claimed is:

1. A switch device, comprising:

a housing;

a pressing member accommodated by a side of the housing, and configured to move from a reference position to a pressed position in a predetermined movement direction upon receiving an external pressing force and return to the reference position upon being released from the external pressing force;

an urging member configured to urge the pressing member toward the reference position;

a plurality of fixed contacts; and at least one movable contact swingable in a direction intersecting with the movement direction of the pressing member, the at least one movable contact being configured, by swinging back and forth in the direction intersecting the movement direction, to connect and disconnect between the plurality of fixed contacts, wherein the pressing member comprises a slider portion extending in a direction oblique to the movement direction and slidable along the at least one movable contact, and the at least one movable contact is pressed by the slider portion in the pressing member by sliding along the at least one movable contact to cause the at least one movable contact to swing away from the side of the housing toward a center of the housing in the direction intersecting the movement direction so as to come in contact with at least one of the plurality of fixed contacts in response to the pressing member moving from the reference position to the pressed position.

2. The switch device according to claim 1, wherein the slider portion has a plurality of inclined surfaces extending in directions oblique at different angles to the movement direction of the pressing member.

3. The switch device according to claim 2, wherein the at least one movable contact comprises an arm electrically connected to one of the plurality of fixed contacts, and the at least one movable contact swings and comes in contact with and separate from another of the plurality of fixed contacts in response to the arm being pressed by the slider portion in the pressing member by the sliding of the pressing member along the at least one movable contact.

4. The switch device according to claim 2, wherein the at least one movable contact comprises a plurality of contact points configured to come in contact with and separate from at least one of the plurality of fixed contacts.

5. The switch device according to claim 2, wherein the at least one movable contact comprises a plurality of movable contacts.

6. The switch device according to claim 2, wherein the plurality of inclined surfaces extend at a smaller angle to the movement direction of the pressing member when the at least one movable contact is in contact with one of the plurality of fixed contacts than when the at least one movable contact is out of contact with the plurality of fixed contacts.

7. The switch device according to claim 6, wherein the at least one movable contact comprises an arm electrically connected to one of the plurality of fixed contacts, and the at least one movable contact swings and comes in contact with and separate from another of the plurality of fixed contacts in response to the arm being pressed by the slider portion in the pressing member by the sliding of the pressing member along the at least one movable contact.

8. The switch device according to claim 6, wherein the at least one movable contact comprises a plurality of contact points configured to come in contact with and separate from at least one of the plurality of fixed contacts.

9. The switch device according to claim 6, wherein the at least one movable contact comprises a plurality of movable contacts.

10. The switch device according to claim 1, wherein the at least one movable contact comprises an arm electrically connected to one of the plurality of fixed contacts, and the at least one movable contact swings and comes in contact with and separate from another of the plurality of fixed contacts in response to the arm being pressed by the slider portion in the pressing member by the sliding of the pressing member along the at least one movable contact.

11. The switch device according to claim 10, wherein the at least one movable contact comprises a plurality of contact points configured to come in contact with and separate from at least one of the plurality of fixed contacts.

12. The switch device according to claim 10, wherein the at least one movable contact comprises a plurality of movable contacts.

13. The switch device according to claim 1, wherein the at least one movable contact comprises a plurality of contact points configured to come in contact with and separate from at least one of the plurality of fixed contacts.

14. The switch device according to claim 13, wherein the at least one movable contact comprises a plurality of movable contacts.

15. The switch device according to claim 1, wherein the at least one movable contact comprises a plurality of movable contacts.

16. The switch device according to claim 15, wherein the pressing member comprises a plurality of the slider portions for the plurality of movable contacts.

17. The switch device according to claim 16, wherein the plurality of movable contacts are a pair of movable contacts, and the pressing member comprises a pair of the slider portions for the pair of movable contacts.

18. The switch device according to claim 1, wherein the plurality of fixed contacts comprise a first fixed contact and a second fixed contact, and the at least one movable contact is electrically connected to the first fixed contact, and the at least one movable contact comes in contact with the second fixed contact in response to the pressing member moving to the pressed position and separates from the second fixed contact in response to the pressing member moving to the reference position.

19. The switch device according to claim 1, wherein the plurality of fixed contacts comprise a first fixed contact and a second fixed contact, and the at least one movable contact is electrically connected to the first fixed contact, and the at least one movable contact separates from the second fixed contact in response to the pressing member moving to the pressed position and comes in contact with the second fixed contact in response to the pressing member moving to the reference position.

20. The switch device according to claim 1, wherein the plurality of fixed contacts comprise a first fixed contact, a second fixed contact, and a third fixed contact, and the at least one movable contact is electrically connected to the first fixed contact, and the at least one movable contact separates from the second fixed contact and comes in contact with the third fixed contact in response to the pressing member moving to the pressed position and separates from the third fixed contact and comes in contact with the second fixed contact in response to the pressing member moving to the reference position.

* * * * *